United States Patent [19]
Nishizawa

[11] Patent Number: 5,661,373
[45] Date of Patent: Aug. 26, 1997

[54] BINARY DIGITAL SIGNAL TRANSMISSION SYSTEM USING BINARY DIGITAL SIGNAL OF ELECTRICALLY DISCHARGED PULSE AND METHOD FOR TRANSMITTING BINARY DIGITAL SIGNAL

[76] Inventor: Atsushi Nishizawa, 3-7, Tanaka 3-Chome, Minato-Ku, Osaka-Shi, Osaka, 552, Japan

[21] Appl. No.: 403,290

[22] Filed: Mar. 13, 1995

[51] Int. Cl.⁶ .............................. H04L 27/00; H04B 3/00
[52] U.S. Cl. .............................................. 375/259; 375/257
[58] Field of Search ...................... 375/259, 257, 375/342, 286, 295, 316; 327/1, 2; 333/13

[56] References Cited

U.S. PATENT DOCUMENTS 4,737,970  4/1988  Viola et al. .............................. 375/106
5,058,131  10/1991  Thackr ..................................... 375/259

FOREIGN PATENT DOCUMENTS 59-178833  10/1984  Japan .

*Primary Examiner*—Stephen Chin
*Assistant Examiner*—T. Ghebretinsae
*Attorney, Agent, or Firm*—Birch, Stewart, Kolasch & Birch, LLP

[57] ABSTRACT

In a binary digital signal transmission system, a transmitter generates a binary digital signal including at least a rise portion where a level of the binary digital signal steeply rises in accordance with inputted binary digital data of a first value, and at least a fall portion where the level of the binary digital signal steeply falls in accordance with the inputted binary digital data of a second value, and then transmits the binary digital signal via a cable to a receiver. On the other hand, the receiver receives the transmitted binary digital signal, and first and second resonance circuits respectively have two resonance frequencies which are even multiples of each other, and extract first and second resonance signals respectively having resonance frequency components of the two resonance frequencies, from the received binary digital signal. Thereafter, a data discriminator discriminates a value of the binary digital data corresponding to the received binary digital signal based on a phase relationship between the extracted first and second resonance signals, and outputs either one of a pulse signal representing the first value and another pulse signal representing the second value.

13 Claims, 15 Drawing Sheets

Electrically Discharged Pulse Transmitter 1

Fig.2 Electrically Discharged Pulse Transmitter 1

Fig.6  Pulse Detection and Polarity Discrimination Circuit JU1a

BINARY DIGITAL SIGNAL TRANSMISSION SYSTEM USING BINARY DIGITAL SIGNAL OF ELECTRICALLY DISCHARGED PULSE AND METHOD FOR TRANSMITTING BINARY DIGITAL SIGNAL

BACKGROUND OF THE INVENTION

1. Field of the Invention

The present invention relates to a binary digital signal transmission system, and a method for transmitting binary digital signal, and in particular, to a binary digital signal transmission system for transmitting a binary digital signal of an electrically discharged pulse, and a method for transmitting binary digital signal using a binary digital signal of an electrically discharged pulse.

2. Description of the Background Art

Conventionally, as a method for transmitting a digital signal through a cable over a relatively long distance, the following method has been used. In a transmitter, a carrier signal is modulated according to a digital signal to be transmitted using a modulation method such as FSK, PSK or the like, and the modulated carrier signal is transmitted to a receiver of the other party. On the other hand, in the receiver thereof, the digital signal is extracted by demodulating the received signal.

Any apparatus utilizing the above-mentioned conventional method has been accompanied by such a problem that the apparatus has a complicated circuit construction and requires a relatively high manufacturing cost.

SUMMARY OF THE INVENTION

An essential object of the present invention is therefore to provide a binary digital signal transmission system capable of transmitting a binary digital signal, the binary digital signal transmission system having a circuit construction simpler than that of the conventional apparatus and requiring a manufacturing cost smaller than that of the conventional apparatus.

Another object of the present invention is to provide a binary digital signal receiver apparatus for receiving a binary digital signal, the receiver apparatus having a circuit construction simpler than that of the conventional apparatus and requiring a manufacturing cost smaller than that of the conventional apparatus.

A further object of the present invention is to provide a method for transmitting a binary digital signal in a manner simpler than that of the conventional apparatus.

According to one aspect of the present invention, there is provided a binary digital signal transmission system for transmitting a binary digital signal via a cable in accordance with inputted binary digital data, comprising a transmitter and a receiver, wherein said transmitter comprises:

transmitting means for generating a binary digital signal including at least a rise portion where a level of said binary digital signal steeply rises in accordance with said inputted binary digital data of a first value, and at least a fall portion where the level of said binary digital signal steeply falls in accordance with said inputted binary digital data of a second value, and for transmitting said binary digital signal via said cable to said receiver, and wherein said receiver comprises:

receiving means for receiving said binary digital signal transmitted by said transmitting means;

first and second resonance circuit means respectively having two resonance frequencies which are even multiples of each other, for extracting first and second resonance signals respectively having resonance frequency components of said two resonance frequencies, from said binary digital signal received by said receiving means; and discriminating means for discriminating a value of said binary digital data corresponding to said received binary digital signal based on a phase relationship between said first and second resonance signals extracted by said two resonance circuit means, and outputting either one of a pulse signal representing the first value and another pulse signal representing the second value.

In the above-mentioned binary digital signal transmission system, said transmitting means comprises:

a first three-state buffer amplifier;

a first diode, an anode of said first diode being connected to an output terminal of said first three-state buffer amplifier, a cathode of said first diode being connected via a first load resistor to ground;

a second three-state buffer amplifier;

a second diode, a cathode of said second diode being connected to an output terminal of said second three-state buffer amplifier, an anode of said second diode being connected via a second load resistor to ground; and first control means for controlling said first and second three-state buffer amplifiers, so that said first three-state buffer amplifier outputs a high-level signal and an output terminal of said second three-state buffer amplifier becomes a high-impedance state in accordance with said inputted binary digital data of the first value, and so that an output terminal of said first three-state buffer amplifier becomes a high-impedance state and said second three-state buffer amplifier outputs a low-level signal in accordance with said inputted binary digital data of the second value.

In the above-mentioned binary digital signal transmission system, said transmitting means, in accordance with said inputted binary digital data of the first value, transmits said binary digital signal, whose voltage steeply rises from a zero-voltage level, thereafter maintains a predetermined positive voltage level for a predetermined time interval, and then reduces to the zero-voltage level according as the time elapses; and said transmitting means, in accordance with said inputted binary digital data of the second value, transmits said binary digital signal, whose voltage steeply falls from a predetermined high level, thereafter maintains the zero-voltage level for a predetermined time interval, and then increases to the high level according as the time elapses.

In the above-mentioned binary digital signal transmission system, said transmitting means comprises:

a first electrolytic capacitor;

a first switch for connecting a positive polarity electrode of said first electrolytic capacitor to an output terminal of said transmitting means, a negative polarity electrode of said first electrolytic capacitor being connected to ground;

a first voltage source for electrically charging said first electrolytic capacitor so as to charge a predetermined positive voltage therein;

a second electrolytic capacitor;

a second switch for connecting a negative polarity electrode of said second electrolytic capacitor to the output terminal of said transmitting means, a positive polarity electrode of said second electrolytic capacitor being connected to ground;

a second voltage source for electrically charging said first electrolytic capacitor so as to charge a predetermined negative voltage therein; and second control means for controlling said first and second switches, so as to turn on said first switch and turn off said second switch in accordance with said inputted binary digital data of the first value, thereby electrically discharging the positive voltage from said first electrolytic capacitor to the output terminal of said transmitting means, and so as to turn off said first switch and turn on said second switch in accordance with said inputted binary digital data of the second value, thereby electrically discharging the negative voltage from said second electrolytic capacitor to the output terminal of said transmitting means.

In the above-mentioned binary digital signal transmission system, said transmitting means, in accordance with said inputted binary digital data of the first value, transmits said binary digital signal, whose voltage steeply rises from the zero-voltage level, and then exponentially reduces to the zero-voltage level; and said transmitting means, in accordance with said inputted binary digital data of the second value, transmits said binary digital signal, whose voltage steeply falls from the zero-voltage level, and then exponentially increases to the zero-voltage level.

In the above-mentioned binary digital signal transmission system, said discriminating means comprises:

first waveform shaping means for detecting a positive-half-wave first pulse signal having a level greater than a predetermined first threshold level from said first resonance signal outputted from said first resonance circuit;

second waveform shaping means for detecting a positive-half-wave second pulse signal having a level greater than a predetermined second threshold level from said second resonance signal outputted from said second resonance circuit;

first AND gate means for calculating a logical product of the first pulse signal outputted from said first waveform shaping means and the second pulse signal outputted from said second waveform shaping means, and outputting a pulse signal representing the resulting logical product;

delay means for delaying the pulse signal by a predetermined time delay time and outputting a delayed pulse signal;

one-shot multi vibrator means for generating a pulse signal having a predetermined time interval from a timing of the trailing edge of the delayed pulse signal outputted from said delay means;

flip-flop means for latching the level of the pulse signal outputted from said second waveform shaping means at a timing of the trailing edge of the delayed pulse signal outputted from said delay means, outputting a non-inverted signal representing the latched level, and outputting an inverted signal of the non-inverted signal;

second AND gate means for calculating a logical product of the pulse signal outputted from said one-shot multivibrator means and the non-inverted signal outputted from said flip-flop means, and outputting a pulse signal representing the resulting logical product, as a pulse signal representing the first value of said inputted binary digital signal; and third AND gate means for calculating a logical product of the pulse signal outputted from said one-shot multivibrator means and the inverted signal outputted from said flip-flop means, and outputting a pulse signal representing the resulting logical product as another pulse signal representing the second value of said inputted binary digital signal.

In the above-mentioned binary digital signal transmission system, said discriminating means comprises:

first waveform shaping means for detecting a positive-half-wave first pulse signal having a level greater than a predetermined first threshold level from said first resonance signal outputted from said first resonance circuit;

second waveform shaping means for detecting a positive-half-wave second pulse signal having a level greater than a predetermined second threshold level from said second resonance signal outputted from said second resonance circuit;

first one-shot multi-vibrator means for generating a pulse signal representing a first half part of the pulse signal outputted from said second waveform shaping means, in accordance with the pulse signal outputted from said second waveform shaping means;

second one-shot multi-vibrator means for generating a pulse signal representing a second half part of the pulse signal outputted from said second waveform shaping means, in accordance with the pulse signal outputted from said first one-shot multi-vibrator means;

third one-shot multi-vibrator means for generating and outputting a non-inverted pulse signal and an inverted pulse signal in accordance with an inputted pulse signal;

fourth one-shot multi-vibrator means for generating and outputting a non-inverted pulse signal and an inverted pulse signal in accordance with an inputted pulse signal;

first AND gate means for calculating a logical product of the first pulse signal outputted from said first waveform shaping means and the pulse signal outputted from said first one-shot multi-vibrator means, and outputting a pulse signal representing the resulting the logical product;

second AND gate means for calculating a logical product of the pulse signal outputted from said first AND gate means and an inverted pulse signal outputted from said fourth one-shot multi-vibrator means, and outputting a pulse signal representing the resulting the logical product to said third one-shot multi-vibrator means;

third AND gate means for calculating a logical product of the first pulse signal outputted from said first waveform shaping means and the pulse signal outputted from said second one-shot multi-vibrator means, and outputting a pulse signal representing the resulting logical product; and fourth AND gate means for calculating a logical product of the pulse signal outputted from said third AND gate means and the inverted pulse signal outputted from said third one-shot multi-vibrator means, and outputting a pulse signal representing the resulting logical product to said fourth one-shot multi-vibrator means;

wherein said third one-shot multi-vibrator means generates as a first output pulse signal corresponding to the first value of said inputted binary digital data, the first output pulse signal having a predetermined first time interval at a timing of the leading edge of the pulse signal outputted from said second AND gate means, and outputs an inverted pulse signal of the generated pulse signal to said fourth AND gate means; and said fourth one-shot multi-vibrator means generates as a second output pulse signal corresponding to the second value of said inputted binary digital data, the second output pulse signal having a predetermined first time interval at a timing of the leading edge of the pulse signal outputted from said fourth AND gate means, and outputs an inverted pulse signal of the generated pulse signal to said second AND gate means.

The above-mentioned binary digital signal transmission system, preferably further comprises:

a third switch, one end of said third switch being connected to an output terminal of said first resonance circuit means, another end of said third switch being connected to ground;

a fourth switch, one end of said fourth switch being connected to an output terminal of said second resonance circuit means, another end of said fourth switch being connected to ground; and third control means for turning on said third and fourth switches in accordance with the pulse signals outputted from said discriminating means.

According to another aspect of the present invention, there is provided a receiver apparatus for receiving a binary digital signal via a cable transmitted from a transmitter in accordance with inputted binary digital data, said binary digital signal including at least a rise portion where a level of said binary digital signal steeply rises in accordance with said inputted binary digital data of a first value, and at least a fall portion where the level of said binary digital signal steeply falls in accordance with said inputted binary digital data of a second value, said receiver comprising:

receiving means for receiving said binary digital signal transmitted by said transmitting means;

first and second resonance circuit means respectively having two resonance frequencies which are even multiples of each other, for extracting first and second resonance signals respectively having resonance frequency components of said two resonance frequencies, from said binary digital signal received by said receiving means; and discriminating means for discriminating a value of said binary digital data corresponding to said received binary digital signal based on a phase relationship between said first and second resonance signals extracted by said two resonance circuit means, and outputting either one of a pulse signal representing the first value and another pulse signal representing the second value.

In the above-mentioned receiver apparatus, said discriminating means comprises:

first waveform shaping means for detecting a positive-half-wave first pulse signal having a level greater than a predetermined first threshold level from said first resonance signal outputted from said first resonance circuit;

second waveform shaping means for detecting a positive-half-wave second pulse signal having a level greater than a predetermined second threshold level from said second resonance signal outputted from said second resonance circuit;

first AND gate means for calculating a logical product of the first pulse signal outputted from said first waveform shaping means and the second pulse signal outputted from said second waveform shaping means, and outputting a pulse signal representing the resulting logical product;

delay means for delaying the pulse signal by a predetermined time delay time and outputting a delayed pulse signal;

one-shot multivibrator means for generating a pulse signal having a predetermined time interval from a timing of the trailing edge of the delayed pulse signal outputted from said delay means;

flip-flop means for latching the level of the pulse signal outputted from said second waveform shaping means at a timing of the trailing edge of the delayed pulse signal outputted from said delay means, outputting a non-inverted signal representing the latched level, and outputting an inverted signal of the non-inverted signal;

second AND gate means for calculating a logical product of the pulse signal outputted from said one-shot multivibrator means and the non-inverted signal outputted from said flip-flop means, and outputting a pulse signal representing the resulting logical product, as a pulse signal representing the first value of said inputted binary digital signal; and third AND gate means for calculating a logical product of the pulse signal outputted from said one-shot multivibrator means and the inverted signal outputted from said flip-flop means, and outputting a pulse signal representing the resulting logical product as another pulse signal representing the second value of said inputted binary digital signal.

In the above-mentioned receiver apparatus, said discriminating means comprises:

first waveform shaping means for detecting a positive-half-wave first pulse signal having a level greater than a predetermined first threshold level from said first resonance signal outputted from said first resonance circuit;

second waveform shaping means for detecting a positive-half-wave second pulse signal having a level greater than a predetermined second threshold level from said second resonance signal outputted from said second resonance circuit;

first one-shot multi-vibrator means for generating a pulse signal representing a first half part of the pulse signal outputted from said second waveform shaping means, in accordance with the pulse signal outputted from said second waveform shaping means;

second one-shot multi-vibrator means for generating a pulse signal representing a second half part of the pulse signal outputted from said second waveform shaping means, in accordance with the pulse signal outputted from said first one-shot multi-vibrator means;

third one-shot multi-vibrator means for generating and outputting a non-inverted pulse signal and an inverted pulse signal in accordance with an inputted pulse signal;

fourth one-shot multi-vibrator means for generating and outputting a non-inverted pulse signal and an inverted pulse signal in accordance with an inputted pulse signal;

first AND gate means for calculating a logical product of the first pulse signal outputted from said first waveform shaping means and the pulse signal outputted from said first one-shot multi-vibrator means, and outputting a pulse signal representing the resulting the logical product;

second AND gate means for calculating a logical product of the pulse signal outputted from said first AND gate means and an inverted pulse signal outputted from said fourth one-shot multi-vibrator means, and outputting a pulse signal representing the resulting the logical product to said third one-shot multi-vibrator means;

third AND gate means for calculating a logical product of the first pulse signal outputted from said first waveform shaping means and the pulse signal outputted from said second one-shot multi-vibrator means, and outputting a pulse signal representing the resulting logical product; and fourth AND gate means for calculating a logical product of the pulse signal outputted from said third AND gate means and the inverted pulse signal outputted from said third one-shot multi-vibrator means, and outputting a pulse signal representing the resulting logical product to said fourth one-shot multi-vibrator means;

wherein said third one-shot multi-vibrator means generates as a first output pulse signal corresponding to the first value of said inputted binary digital data, the first output pulse signal having a predetermined first time interval at a timing of the leading edge of the pulse signal outputted from said second AND gate means, and outputs an inverted pulse signal of the generated pulse signal to said fourth AND gate means; and said fourth one-shot multi-vibrator means generates as a second output pulse signal corresponding to the second value of said inputted binary digital data, the second output pulse signal having a predetermined first time interval at a timing of the leading edge of the pulse signal outputted from said fourth AND gate means, and outputs an inverted pulse signal of the generated pulse signal to said second AND gate means.

The above-mentioned receiver apparatus preferably further comprises:

a third switch, one end of said third switch being connected to an output terminal of said first resonance circuit means, another end of said third switch being connected to ground;

a fourth switch, one end of said fourth switch being connected to an output terminal of said second resonance circuit means, another end of said fourth switch being connected to ground; and third control means for turning on said third and fourth switch in accordance with the pulse signals outputted from said discriminating means.

According to a further aspect of the present invention, there is provided a method for transmitting a binary digital signal via a cable in accordance with inputted binary digital data, for use in a binary digital signal transmission system comprising a transmitter, a receiver and said cable for connecting said transmitter to said receiver, said method including the following steps of:

generating a binary digital signal including at least a rise portion where a level of said binary digital signal steeply rises in accordance with said inputted binary digital data of a first value, and at least a fall portion where the level of said binary digital signal steeply falls in accordance with said inputted binary digital data of a second value;

transmitting said binary digital signal from said transmitter via said cable to said receiver, and receiving said transmitted binary digital signal via said cable;

extracting first and second resonance signals respectively having resonance frequency components of said two resonance frequencies, from said received binary digital signal, using first and second resonance circuit means respectively having two resonance frequencies which are even multiples of each other; and discriminating a value of said binary digital data corresponding to said received binary digital signal based on a phase relationship between said extracted first and second resonance signals, and outputting either one of a pulse signal representing the first value and another pulse signal representing the second value.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Preferred embodiments according to the present invention will be described with reference to the accompanying drawings.

Figure 1:
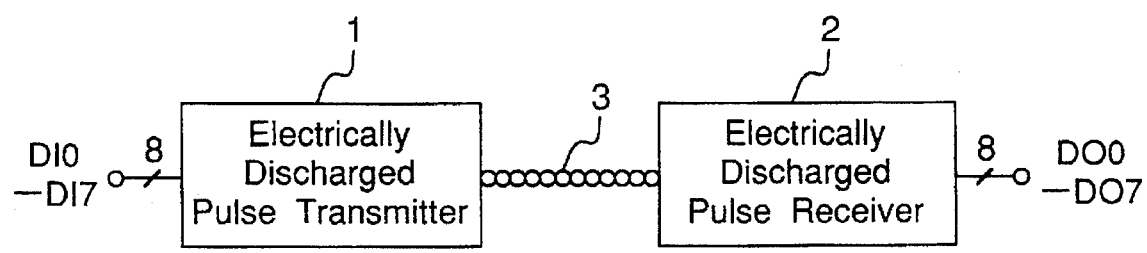
FIG. 1 is a block diagram showing a construction of a binary digital signal transmission system employing an electrically discharged pulse according to a preferred embodiment of the present invention.

FIG. 1 is a block diagram showing a structure of a binary digital signal transmission system having a discharge pulse according to a preferred embodiment of the present invention.

Referring to FIG. 1, the binary digital signal transmission system of the present preferred embodiment is comprised of an electrically discharged pulse transmitter (referred to as a transmitter hereinafter) 1, an electrically discharged pulse receiver (referred to as a receiver hereinafter) 2, and a copper wire twisted pair cable (referred to as a cable hereinafter) 3 for connection between the transmitter 1 and the receiver 2. In the present case, the transmitter 1 converts digital data inputted in a form of an eight bit parallel signal, into a binary digital signal of an electrically discharged pulse, and then transmits the converted binary digital signal to the receiver 2 by way of the cable 3. In response to the binary digital signal, the receiver 2 converts the received binary digital signal into digital data, and then outputs the converted digital data in a form of an eight bit parallel signal.

Figure 5:
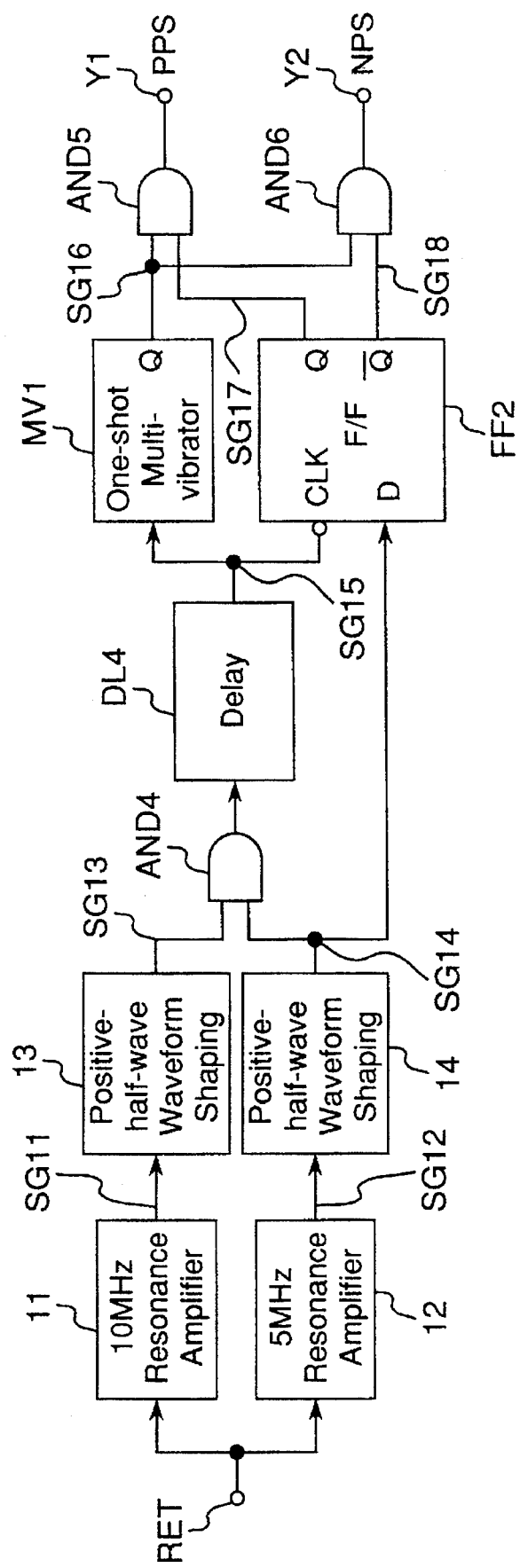
FIG. 5 is a circuit diagram showing a construction of a pulse detection and polarity discrimination circuit JU1 shown in FIG. 4.

In particular, the binary digital signal transmission system of the present preferred embodiment has the following features. In a pulse detection and polarity discrimination circuit JU1 provided inside the receiver 2, a received binary digital signal is subjected to a bandpass filtering process to obtain only two resonance frequency components by means of a resonance amplifier 11 having a resonance frequency of 10 MHz and a resonance amplifier 12 having a resonance frequency of 5 MHz as shown in FIG. 5. The resulting resonance frequency components are amplified respectively, and thereafter, are subjected to a waveform shaping process so as to extract only two positive half waves from the respective resonance frequency component signals by means of positive-half-wave waveform shaping circuits 13 and 14. Then, based on the respective signals obtained through the waveform shaping process, discrimination of the polarity of the binary digital signal is effected so as to reproduce the digital data inputted into the transmitter 1 for digital data transmission.

In the digital signal transmission system of the present preferred embodiment, a binary digital signal having one of two types of discharge pulses as follows is utilized.

Figure 8:
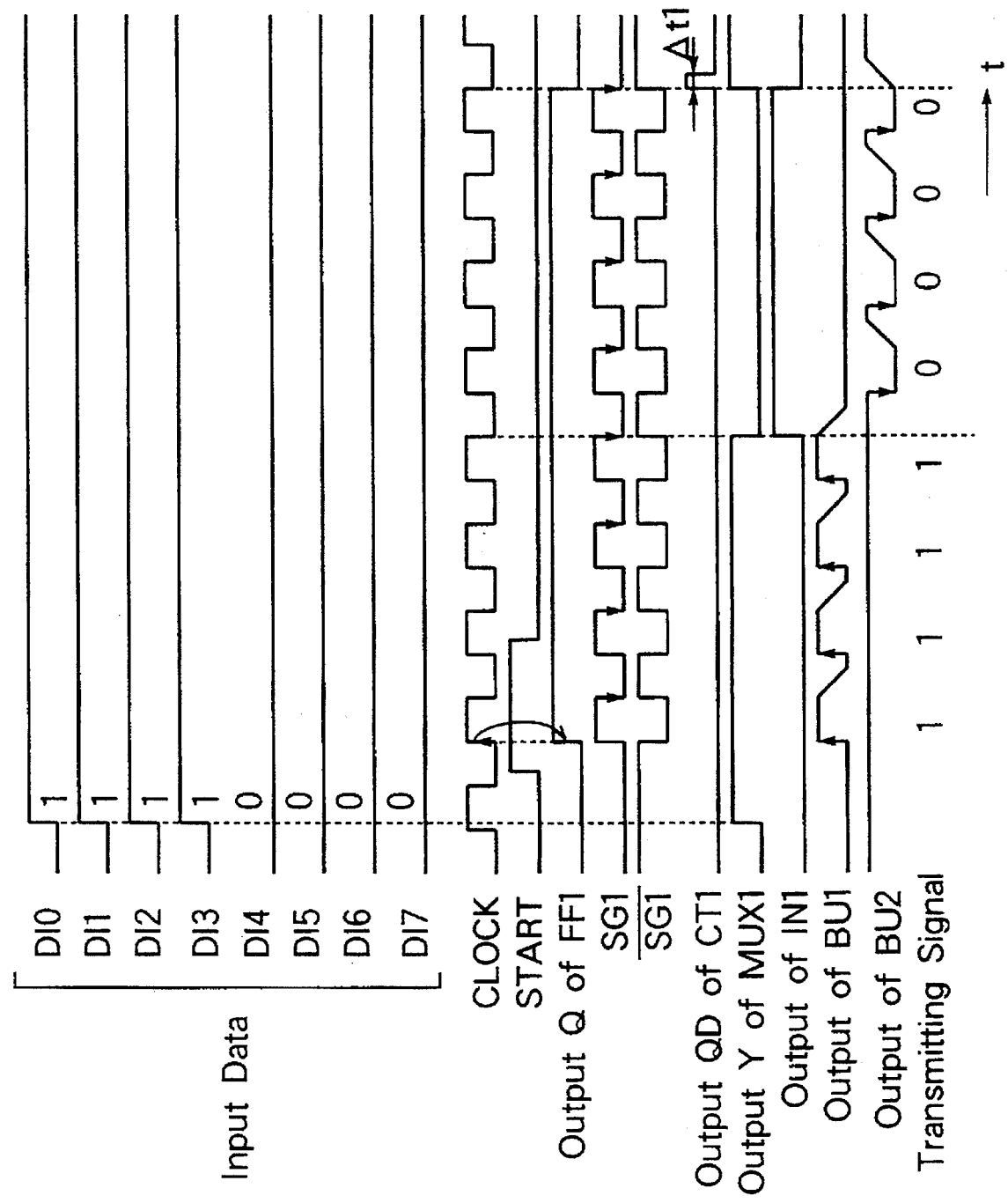
FIG. 8 is a timing chart showing an operation of the electrically discharged pulse transmitter 1 shown in FIG. 2.

(a) First digital signal: a digital signal having a trapezoidal waveform as shown in the outputs of BU1 and BU2 of FIG. 8.

(a-1) High-level first digital signal: a digital signal, whose voltage steeply rises from a zero-voltage level, thereafter maintains a predetermined positive voltage level for a predetermined time interval, and then reduces to the zero-voltage level according as the time elapses.

(a-2) Low-level first digital signal: a digital signal, whose voltage steeply falls from a predetermined High level, thereafter maintains the zero-voltage level for a predetermined time interval, and then increases to the High level according as the time elapses.

Figure 9:
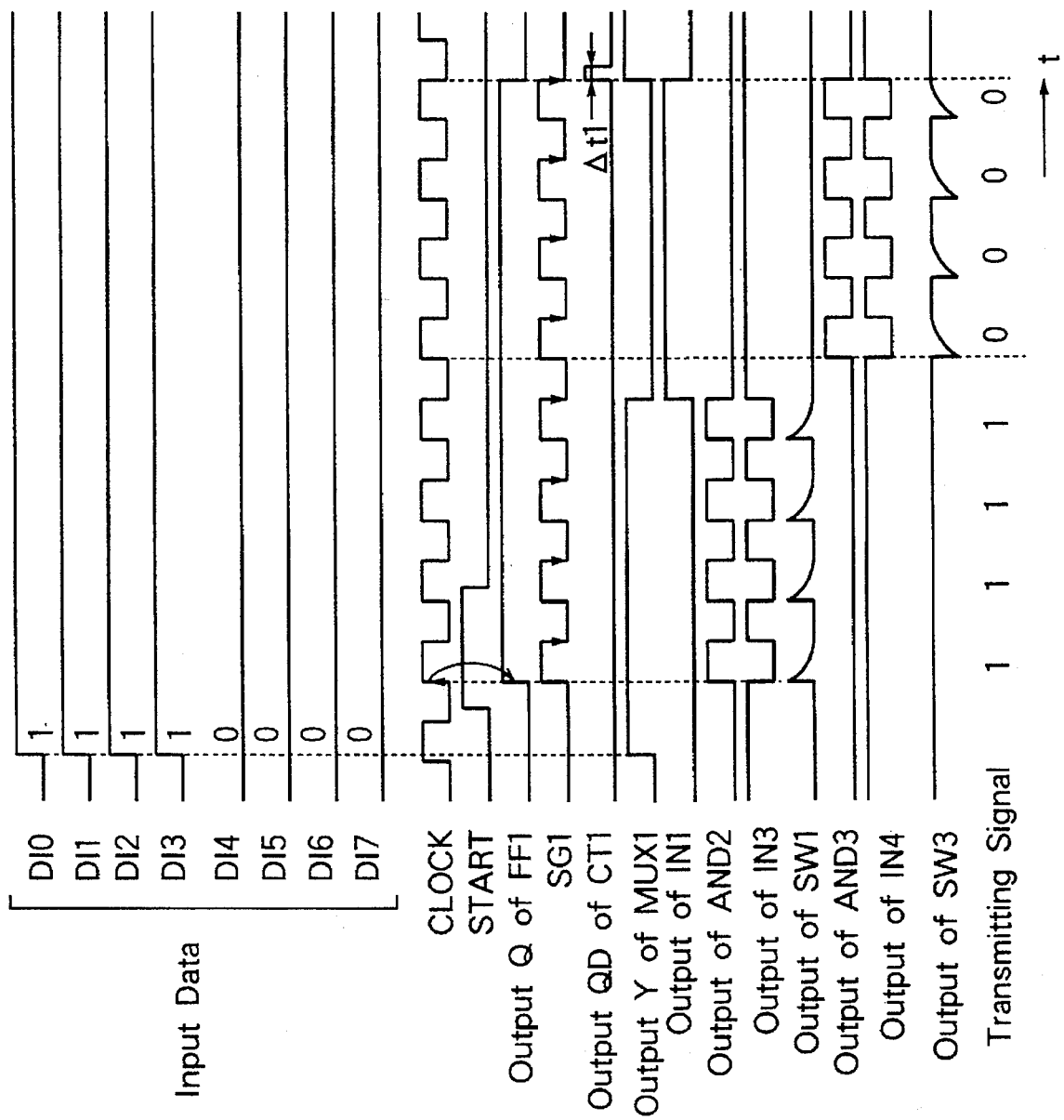
FIG. 9 is a timing chart showing an operation of the electrically discharged pulse transmitter 1a shown in FIG. 3.

(b) Second digital signal: a digital signal, of which voltage is discharged so as to have a voltage waveform which exponentially reduces as shown in the outputs of SW1 and SW3 of FIG. 9.

(b-1) High-level second digital signal: a digital signal, whose voltage steeply rises from the zero-voltage level, and then exponentially reduces to the zero-voltage level.

(b-2) Low-level second digital signal: Digital signal, whose voltage steeply falls from the zero-voltage level, and then exponentially increases to the zero-voltage level.

However, the above-mentioned binary digital signal having an electrically discharged pulse of the present invention is not limited to this, and the binary digital signal of the present invention is essentially required to be a signal which has either one of a rise portion where the voltage thereof at least rises steeply in the case of High level, and a fall portion where the voltage thereof at least falls steeply in the case of Low level. Alternatively, the binary digital signal of the present invention may be a signal which has either one of a rise portion where the voltage thereof at least rises steeply in the case of Low level, and a fall portion where the voltage thereof at least falls steeply in the case of High level.

Figure 2:
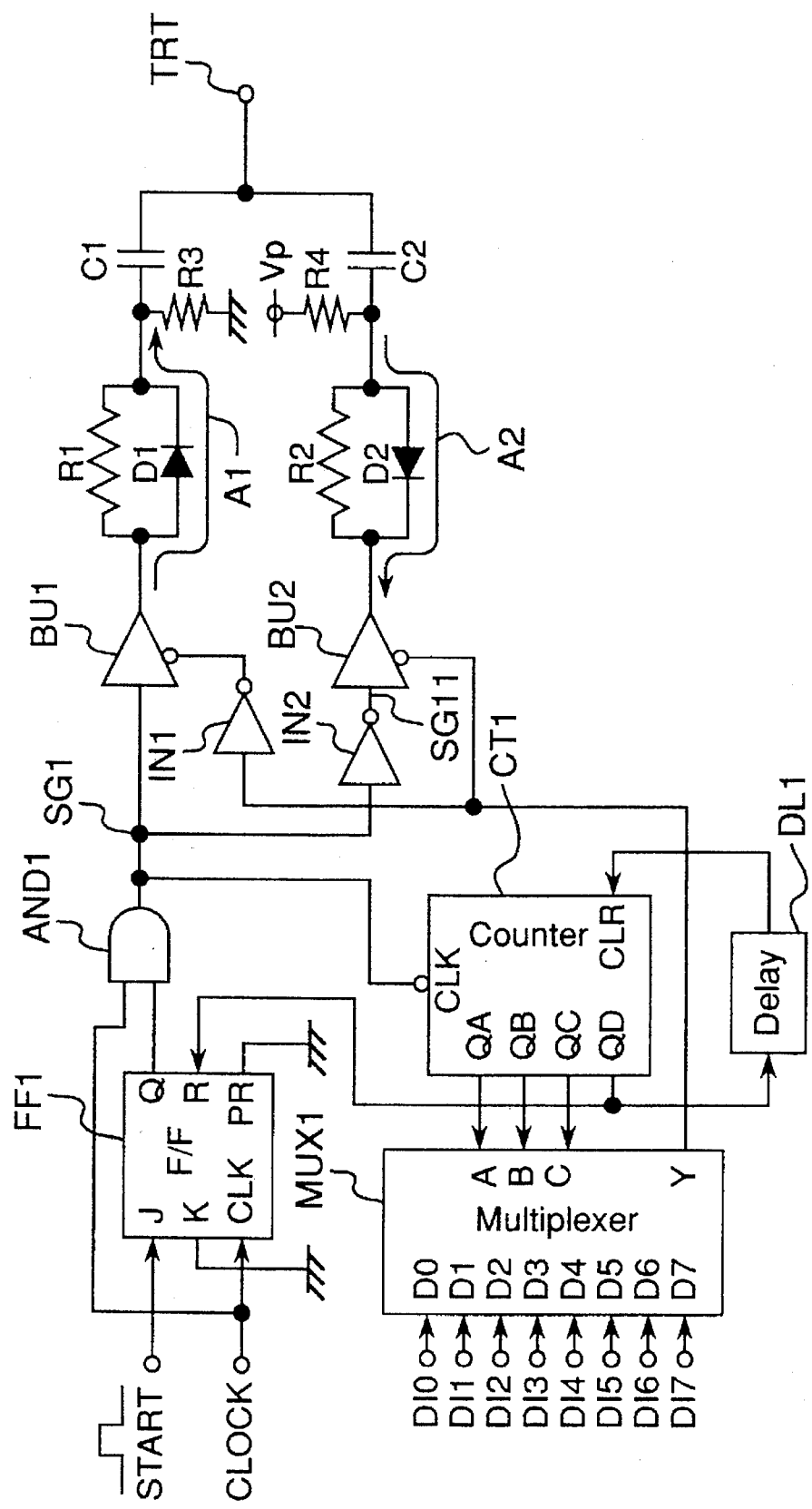
FIG. 2 is a circuit diagram showing a construction of an electrically discharged pulse transmitter 1 shown in FIG. 1.

FIG. 2 is a circuit diagram showing a construction of the electrically discharged pulse transmitter 1 for generating the above-mentioned first digital signal.

Referring to FIG. 2, a High-level start signal START having a predetermined pulse width for starting transmission of eight bit digital data is inputted to an input terminal J of a J-K type flip-flop FF1, and an input terminal K of the flip-flop is grounded. On the other hand, a clock signal CLOCK is inputted to a clock terminal CLK of the flip-flop FF1 and a first input terminal of an AND gate AND1. After the start signal START is inputted, the flip-flop FF1 outputs the output signal thereof from an output terminal Q thereof to a second input terminal of the AND gate AND1, for a time interval from the timing of the leading edge of the clock signal CLOCK, to a timing when a count value of an up counter CT1 becomes "eight" (QD="1") and then a High-level signal is inputted to a reset terminal R of the flip-flop FF1.

The AND gate AND1 outputs the clock signal CLOCK as a signal SG1 to a clock terminal CLK of the counter CT1 only when the flip-flop FF1 outputs the High-level signal. The signal SG1 is also outputted to an anode of a diode D1 of a parallel circuit comprising a resistor R1 and the diode D1 which are connected in parallel with each other via a three-state buffer amplifier BU1, and is further outputted to a cathode of a diode D2 of a parallel circuit comprising a resistor R2 and the diode D2 which are connected in parallel with each other via an inverter IN2 and a three-state buffer amplifier BU2. The cathode of the diode D1 is connected to the ground via a load resistor R3, and is also connected to a transmission terminal TRT via a capacitor C1. An anode of the diode D2 is pulled up so as to be connected to a predetermined positive voltage source Vp via a pull-up resistor R4, and is also connected to the transmission terminal TRT via a capacitor C2. The transmission terminal TRT is connected to a reception terminal RET (shown in FIG. 4) of the electrically discharged pulse receiver 2 via the cable 3 in a manner as shown in FIG. 1.

The counter CT1 counts the pulses of the signal SG1 inputted to the clock terminal CLK thereof, and outputs a three bit count value data from output terminals QA through QC thereof to switching control terminals A, B and C of a multiplexer MUX1. When the count value of the counter CT1 becomes "eight", a clearing signal is outputted from an output terminal QD of the counter CT1 to a reset terminal R of the flip-flop FF1, and is further outputted to a clearing terminal CLR of the counter CT1 via a delay circuit DL1 having a predetermined delay time At1 equal to about one fourth of the period of the clock signal CLOCK, thereby resetting the count value of the counter CT1 to zero.

Eight bit digital data DI0 through DI7 to be transmitted are simultaneously inputted in parallel with each other to input terminals D0 through D7 of the muitiplexer MUX1. The multiplexer MUX1 outputs the digital data inputted from one terminal of the eight bit input terminals D0 through D7 selectively and sequentially bit by bit from an output terminal Y thereof to an inversion control terminal of the three-state buffer amplifier BU2 according to three bit count values QA, QB and QC counted by the counter CT1, and outputs the digital data to an inversion control terminal of the three-state buffer amplifier BU1 via an inverter IN1. Therefore, the multiplexer MUX1, the counter CT1 and the delay circuit DL1 constitute a parallel to serial converter circuit.

An operation of the electrically discharged pulse transmitter 1 having the above-mentioned construction will be described with reference to a timing chart shown in FIG. 8.

First of all, when a transmission signal of "1" is to be transmitted, a High-level signal is outputted from the output terminal Y of the multiplexer MUX1 in a manner as shown in a fore part of the timing chart of FIG. 8. Then, a High-level signal is outputted from the buffer amplifier BU1, and the output terminal of the buffer amplifier BU2 becomes a high impedance state. At that time, the output terminal of the buffer amplifier BU1 becomes the High level, and therefore a current A1 flows to the ground via the diode D1 and the load resistor R1 in a manner as indicated by an arrow in FIG. 2. With the flow of the current A1 through the load resistor R3, a positive pulse voltage induced across the load resistor R3 is outputted via the capacitor C1 to the transmission terminal TRT. Therefore, the positive pulse voltage once steeply rises from the zero-voltage level to the High level, and thereafter, keeps or maintains a predetermined High level until the signal outputted from the buffer amplifier BU1 changes from the High level to the Low level. When the signal outputted from the buffer amplifier BU1 becomes a Low level, an electric charge of a voltage which has been electrically charged in the capacitor C1 is discharged, and therefore, the above-mentioned positive pulse voltage reduces to the zero-voltage level according to a discharge curve of a time constant C1.R1 depending on the resistor R1 and the capacitor C1. In other words, a High-level digital signal is transmitted from the transmitter 1 via the transmission terminal TRT.

When a transmission signal of "0" is to be transmitted, a Low-level signal is outputted from the output terminal Y of the multiplexer MUX1 in a manner as shown in a hind part of the timing chart of FIG. 8. Then, the output terminal of the buffer amplifier BU1 becomes a high impedance state, and a Low-level signal is outputted from the buffer amplifier BU2. At that time, the output terminal of the buffer amplifier BU2 becomes the Low level, and therefore, a current A2 flows from the voltage source Vp through the pull-up resistor R4 and the diode D2 to the output terminal of the buffer amplifier BU2. With the above-mentioned operation, a voltage applied via the capacitor C2 to the transmission terminal TRT steeply changes from the High level achieved by the pull-up operation of the voltage source Vp to the Low level, and thereafter, maintains a predetermined Low level until the signal outputted from the buffer amplifier BU2 becomes the High level. When the signal outputted from the buffer amplifier BU2 becomes the High level, the above-mentioned signal is electrically charged into the capacitor C2 and then is outputted. Therefore, a voltage outputted from the transmission terminal TRT increases according to a charge curve of a time constant C2.R2 depending on the resistor R2 and the capacitor C2, and then becomes the High level. In other words, a Low-level digital signal is transmitted from the transmitter 1 via the transmission terminal TRT.

When the transmission of the eight bit transmission signal is completed, after time delay is effected for a delay time $\Delta t1$ by means of the delay circuit DL1, the counter CT1 and the flip-flop FF1 are reset to be ready for the transmission of the subsequent eight bit digital data.

Figure 3:
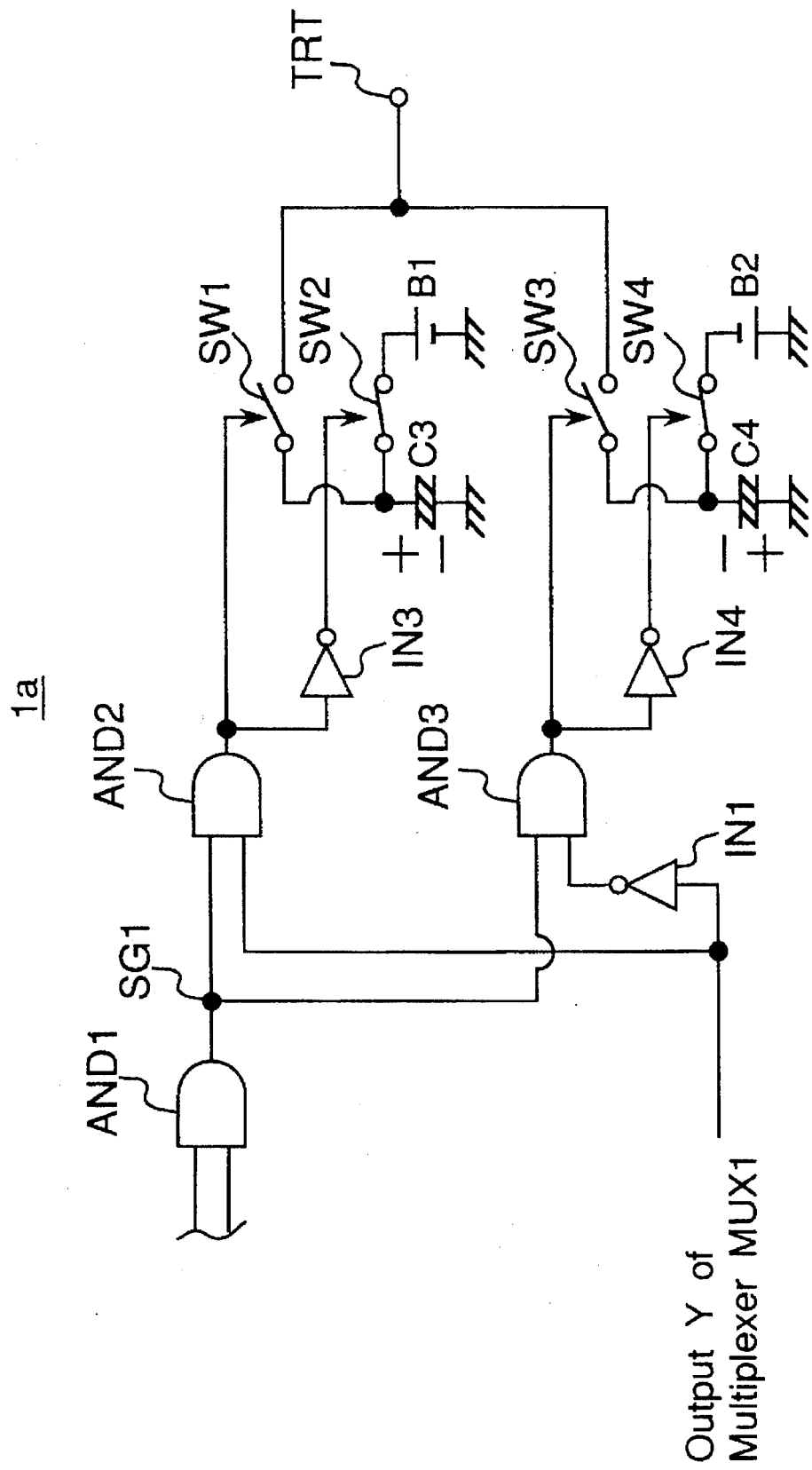
FIG. 3 is a circuit diagram showing a construction of an electrically discharged pulse transmitter 1a of a modification of the electrically discharged pulse transmitter 1 shown in FIG. 2.

FIG. 3 shows a transmitter 1a of a modification of the above-mentioned electrically discharged pulse transmitter 1 shown in FIG. 2. As is apparent from a comparison between FIG. 3 and FIG. 2, the transmitter 1a of the modification has a circuit part after the AND gate AND1, which is different from the circuit part of the transmitter 1 of the preferred embodiment shown in FIG. 2.

In more detail, a signal SG1 outputted from an AND gate AND1 is inputted to a first input terminal of an AND gate AND2 and to a first input terminal of art AND gate AND3.

On the other hand, an output signal from the output terminal Y of the multiplexer MUX1 is inputted to a second input terminal of the AND gate AND2, and is inputted to a second input terminal of the AND gate AND3 via an inverter IN1.

A signal outputted from the AND gate AND2 is inputted to a control terminal of an analog switch SW1 and is also inputted to a control terminal of an analog switch SW2 via an inverter IN3. Respective one terminals of the analog switches SW1 and SW2 are connected to a positive polarity electrode of an electrolytic capacitor C3. On the other hand, another terminal of the analog switch SW1 is connected to the transmission terminal TRT, and another terminal of the analog switch SW2 is connected to a positive polarity electrode of a direct-current voltage source (referred to as a DC voltage source hereinafter) B1 such as a battery or the like. Further, the negative polarity electrode of the electrolytic capacitor C3 and the negative polarity electrode of the DC voltage source B1 are grounded. The switching positions of the respective analog switches SW1 and SW2 are those in the case where a Low-level signal is outputted from the AND gate AND2, when the analog switch SW1 is turned off, and the analog switch SW2 is turned on. At that time, the electrolytic capacitor C3 is electrically charged by the DC voltage source B1 so that one terminal of the analog switch SW1 has a positive DC voltage.

A signal outputted from the AND gate AND3 is inputted to a control terminal of an analog switch SW3 and is also inputted to a control terminal of an analog switch SW4 via an inverter IN4. Respective one terminals of the analog switches SW3 and SW4 are connected to a negative polarity electrode of an electrolytic capacitor C4. On the other hand, another of the analog switch SW3 is connected to the transmission terminal TRT, and another terminal of the analog switch SW4 is connected to a negative polarity electrode of a DC voltage source B2 such as a battery or the like. Further, the positive polarity electrode of the electrolytic capacitor C4 and the positive polarity electrode of the DC voltage source B2 are grounded. The switching positions of the respective analog switches SW3 and SW4 are those in the case where a Low-level signal is outputted from the AND gate AND3, when the analog switch SW3 is turned off, and the analog switch SW4 is turned on. At that time, the electrolytic capacitor C4 is electrically charged by the DC voltage source B2 so that one terminal of the analog switch SW3 has a negative DC voltage.

In the transmitter 1a shown in FIG. 3, each of the analog switches SW1 through SW4 may be implemented by a relay having mechanical contact points or by a switching element such as a transistor or the like. When it is desired to transmit a digital signal over a longer distance, the voltages of the DC voltage sources B1 and B2 are required to be increased.

An operation of the electrically discharged pulse transmitter 1a having the above-mentioned construction will be described with reference to a timing chart shown in FIG. 9.

First of all, when a transmission signal of "1" is to be transmitted, a High-level pulse signal is outputted from the AND gate AND2 in a manner as shown in a fore part of the timing chart of FIG. 9. Then, the analog switch SW1 is turned on and the analog switch SW2 is turned off. On the other hand, an output terminal of the AND gate AND3 still remains to be the Low level, and therefore, the analog switch SW3 remains to be turned off. At that time, electric charges charged in the electrolytic capacitor C3 is discharged. In other words, the voltage at the transmission terminal TRT once steeply changes from zero voltage to a predetermined positive voltage, and thereafter, the voltage reduces from the positive voltage to zero voltage according to a discharge curve thereof. In other words, a High-level second digital signal is transmitted from the transmitter 1a via the transmission terminal TRT.

On the other hand, when a transmission signal of "0" is to be transmitted, a High-level pulse signal is outputted from the AND gate AND3 in a manner as shown in a hind part of FIG. 9. Then, the analog switch SW3 is turned on and the analog switch SW4 is turned off. On the other hand, an output terminal of the AND gate AND2 remains to be the Low level, and therefore, the analog switch SW1 remains to be turned off. At that time, electric charges charged in the electrolytic capacitor C4 is discharged. In other words, the voltage at the transmission terminal TRT once steeply changes to a predetermined negative voltage, and thereafter, the voltage increases from the negative voltage to the zero-voltage level according to the discharge curve thereof. In other words, a Low-level second digital signal is transmitted from the transmitter 1a via the transmission terminal TRT.

Figure 4:
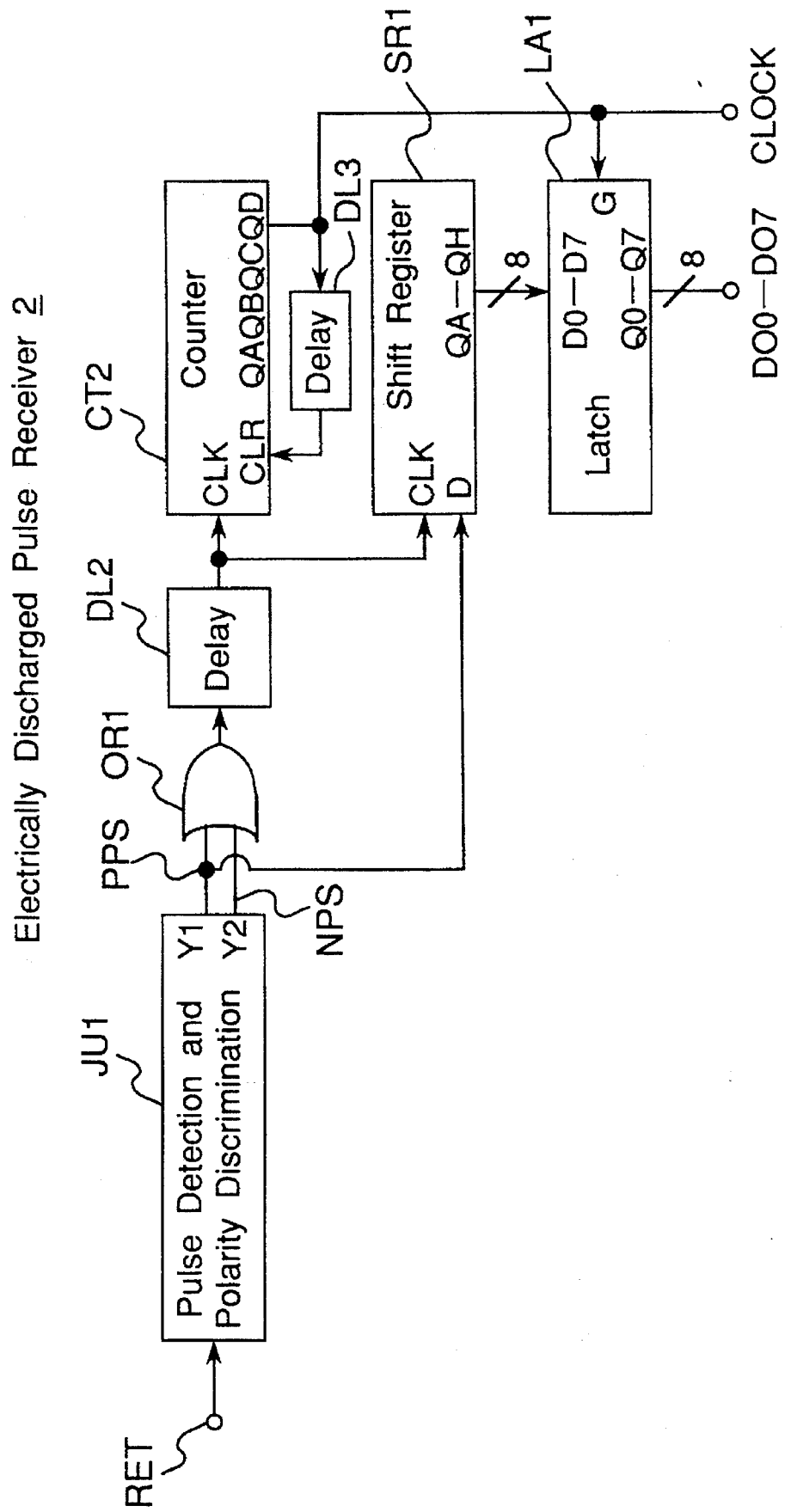
FIG. 4 is a circuit diagram showing a construction of an electrically discharged pulse receiver 2 shown in FIG. 1.

FIG. 4 shows a circuit diagram showing a construction of the electrically discharged pulse receiver 2 shown in FIG. 1.

Figure 6:
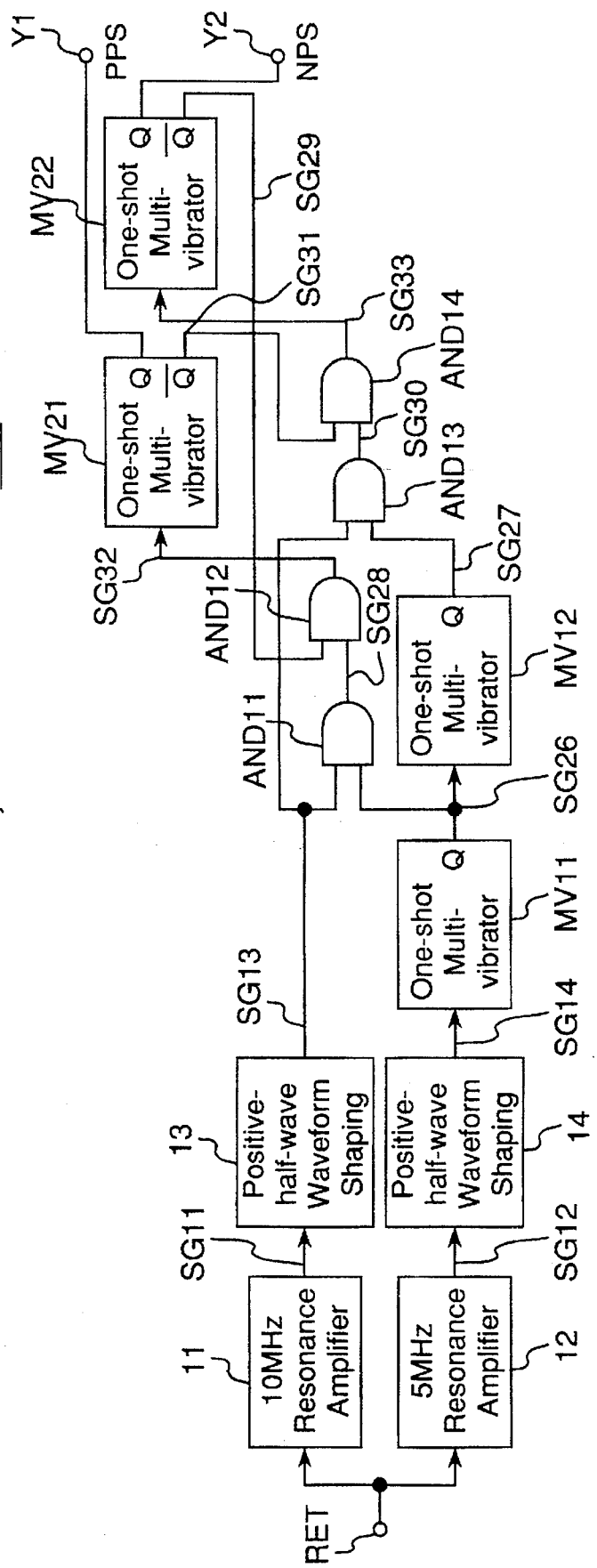
FIG. 6 is a circuit diagram showing a construction of a pulse detection and polarity discrimination circuit JU1a of a first modification of the pulse detection and polarity discrimination circuit JU1 shown in FIG. 5.

Referring to FIG. 4, a pulse detection and polarity discrimination circuit JU1 shown in FIGS. 5 and 6 detects a pulse of a digital signal having an electrically discharged pulse from a reception signal received from the transmitter 1 via a reception terminal RET thereof, and discriminates the polarity of the pulse, namely, discriminates whether the signal is either a High-level digital signal or a Low-level digital signal. When detecting the High-level digital signal, the circuit JU1 outputs a High-level positive pulse signal PPS from an output terminal Y1 thereof to a first input terminal of an OR gate OR1 and to an input terminal D of a shift register SR1. On the other hand, when detecting the Low-level digital signal, the circuit JU1 outputs the High-level negative pulse signal NPS from an output terminal Y2 thereof to a second input terminal of the OR gate OR1. A signal outputted from the OR gate OR1 is inputted to a clock input terminal CLK of an up counter CT2, and is inputted to a clock input terminal CLK of the shift register SR1 via a delay circuit DL2 having a predetermined delay time Δt2 substantially equal to about one fourth of the period of the clock signal CLOCK on the side of the transmitter 1.

The counter CT2 counts High-level positive or negative pulses which are outputted from the pulse detection and polarity discrimination circuit JU1 and thereafter inputted through the OR gate OR1 and the delay circuit DL2. When the count value reaches "eight", the counter CT2 outputs a High-level signal from an output terminal QD thereof via a delay circuit DL3 having a delay time Δt3 approximately equal to the above-mentioned delay time Δt2 to a clearing terminal CLR thereof, thereby resetting the count value of the counter CT2 to "0". The above-mentioned High-level signal is inputted as a latch command signal in a form of eight bit digital data received and demodulated to a latch timing input terminal G of a latch circuit LA1, and then, is outputted as a clock signal CLOCK.

A shift register SR1 serially stores the positive pulse signal PPS outputted from the output terminal Y1 of the pulse detection and polarity discrimination circuit JU1 while shifting the positive pulse signal PPS by using a timing signal outputted from the delay circuit DL2 as a clock signal. Therefore, the shift register SR1 stores the positive pulse signal PPS as High-level data, and stores Low-level data at a timing corresponding to the negative pulse signal NPS. Then, when eight bit digital data has been serially stored, the eight bit digital data serially stored in the shift register SR1 in correspondence with the above-mentioned eight bit reception signal is latched in the latch circuit LA1 in accordance with a timing when the latch command signal is inputted from the counter CT2 to the latch circuit LA1, and thereafter, is outputted as eight bit parallel digital data DO0 through DO7.

Figure 10:
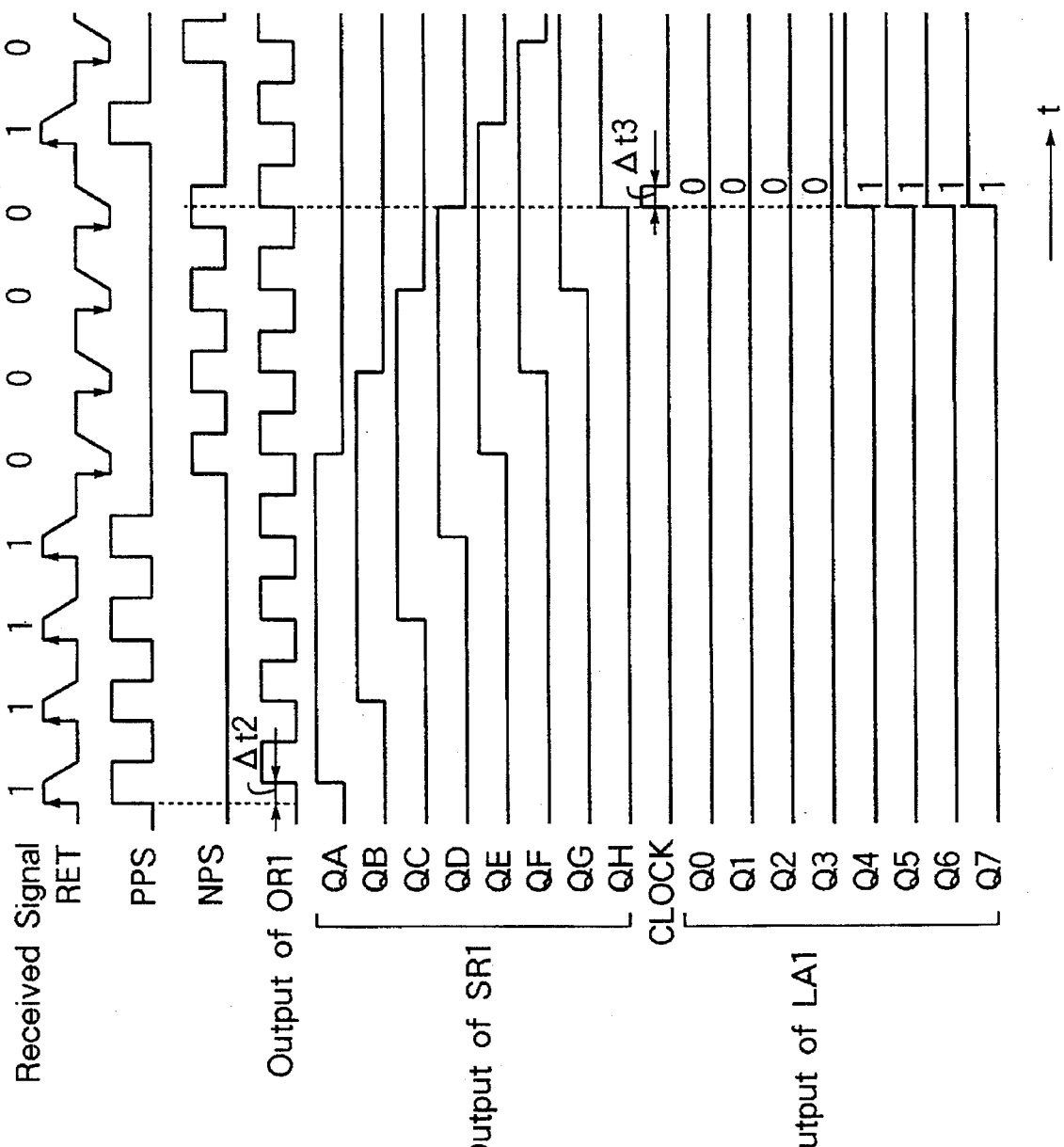
FIG. 10 is a timing chart showing an operation of the electrically discharged pulse receiver 2 shown in FIG. 4.

An operation of the receiver 2 having the above-mentioned construction will be described with reference to a timing chart shown in FIG. 10.

First of all, when a reception signal of "1" is received, the pulse detection and polarity discrimination circuit JU1 outputs a High-level positive pulse signal PPS, and after an elapse of the delay time Δt2 from the above timing when outputting the High-level positive pulse signal PPS, the OR gate OR1 outputs the positive pulse signal PPS to the counter CT2 and also outputs the same signal PPS to the shift register SR1. At that time, a High-level signal is outputted from an output terminal QA of the shift register SR1. Thereafter, when a three bit reception signal of "1" is received, the shift register SR1 serially shifts a total of four bit High-level data.

Thereafter, when a reception signal of "0" is received, the pulse detection and polarity discrimination circuit JU1 outputs a High-level negative pulse signal NPS, and after an elapse of the delay time Δt2 from the above timing when outputting the same High-level negative pulse signal PPS, the OR gate OR1 outputs the negative pulse signal NPS to the counter CT2 and also outputs the same negative pulse signal NPS to the shift register SR1. At that time, a Low-level signal is outputted from the output terminal QA of the shift register SR1. Thereafter, when a three bit reception signal of "0" is further received, the shift register SR1 serially shifts a total of eight bit data including four bit High-level data and four bit Low-level data. Then, after an elapse of the delay time Δt2 from the timing when the total of eight bit positive pulse signal PPS or negative pulse signal NPS is received, the counter CT2 outputs the signal which serves as the latch command signal and the clock signal CLOCK. At this timing, the total of eight bit digital data is latched in the latch circuit LA1 from the shift register SR1 and then is outputted as parallel data DO0 through DO7. Therefore, the counter CT2, the delay circuit DL3, the shift register SR1, and the latch circuit LA1 constitute a serial to parallel converter circuit.

FIG. 5 is a circuit diagram showing a construction of the pulse detection and polarity discrimination circuit JU1 shown in FIG. 4.

Referring to FIG. 5, a digital signal having an electrically discharged pulse received via the reception terminal RET is inputted to a resonance amplifier 11 having a resonance frequency of 10 MHz and a resonance amplifier 12 having a resonance frequency of 5 MHz. The resonance amplifier 11 extracts a frequency component of 10 MHz from frequency components of the inputted digital signal through a band-pass filtering process by tuning the frequency component of 10 MHz with the resonance frequency of an LCR resonance circuit thereof, and thereafter, amplifies the extracted frequency component. The resulting signal obtained through the tuning or resonance amplification process by the resonance amplifier 11 is outputted as a signal SG11. On the other hand, the resonance amplifier 12 extracts a frequency component of 5 MHz from the frequency components of the inputted digital signal through a band-pass filtering process by tuning the frequency component of 5 MHz with the resonance frequency of an LCR resonance circuit thereof, and thereafter, amplifies the extracted frequency component. The resulting signal obtained through the tuning or resonance amplification process by the resonance amplifier 12 is outputted as a signal SG12. In the present case, the digital signal transmitted by the transmitter 1 includes either a rise portion where the signal level steeply rises or a fall portion where the signal level steeply falls, and therefore, frequency components including very high frequencies are contained therein. However, each of the signal SG11 and SG12 obtained by tuning the frequency components of 10 MHz and 5 MHz with the resonance frequencies of the resonance circuits of the respective resonance amplifiers 11 and 12 includes only one rise portion per bit or only one fall portion per bit, and therefore, each of the signals becomes a signal, of which signal level increases and thereafter reduces in a manner as shown in FIGS. 11 through 14.

Then, the positive-half-wave waveform shaping circuit 13 extracts the positive-half-wave signal having a level equal to or greater than a predetermined threshold level Th1 from the signal SG11 inputted thereto, thereafter shapes the waveform of the positive half wave as a pulse signal, and then, outputs the resulting pulse signal SG13 to a first input terminal of an AND gate AND4. On the other hand, a positive-half-wave waveform shaping circuit 14 extracts the positive-half-wave signal having a level equal to or greater than a predetermined threshold level Th2 from the signal SG12 inputted thereto, thereafter shapes the waveform of the positive half wave as a pulse signal in the same manner as in the positive-half-wave waveform shaping circuit 13, and then, outputs the resulting pulse signal SG14 to a second input terminal of the AND gate AND4, and also outputs the same pulse signal SG14 to an input terminal D of a delay type flip-flop FF2.

The AND gate AND4 outputs a pulse signal to a one-shot multi-vibrator MV1 and to an inversion clock terminal CLK of the flip-flop FF2 via a delay circuit DL4 having a delay time Δt4 slightly smaller than one fourth of the period of the frequency of 10 MHz when positive half waves are generated in the two resonance amplifiers 11 and 12. The one-shot multi-vibrator MV1 generates a High-level pulse signal having a predetermined time interval T1 from the timing of the trailing edge of the High-level pulse signal ((two periods of 10 MHz)<T1<(four periods of 10 MHz) in the present preferred embodiment), and outputs the High-level pulse signal as a signal SG16 to a first input terminal of each of AND gates AND5 and AND6. In the present case, the above-mentioned time interval T1 is set so as to be longer than two periods of the low resonance frequency (5 MHz in the present preferred embodiment) and shorter than the signal period of the transmission signal. On the other hand, the flip-flop FF2 latches the level of the signal SG14 at the timing of the trailing edge of the signal SG15 inputted to a clock terminal CLK thereof, outputs the signal having the above-mentioned level as a signal SG17 from an output terminal Q thereof to a second input terminal of the AND gate AND5, and outputs a signal obtained by inverting the level of the signal SG14 from an inverted output terminal $\bar{Q}$ thereof as a signal SG18 to a second input terminal of the AND gate AND6.

Further, the AND gate AND5 outputs the positive pulse signal PPS via an output terminal Y1 of the pulse detection and parity discrimination Circuit JU1. On the other hand, the AND gate AND6 outputs the negative pulse signal NPS via an output terminal Y2 of the pulse detection and parity discrimination circuit JU1.

Figure 11:
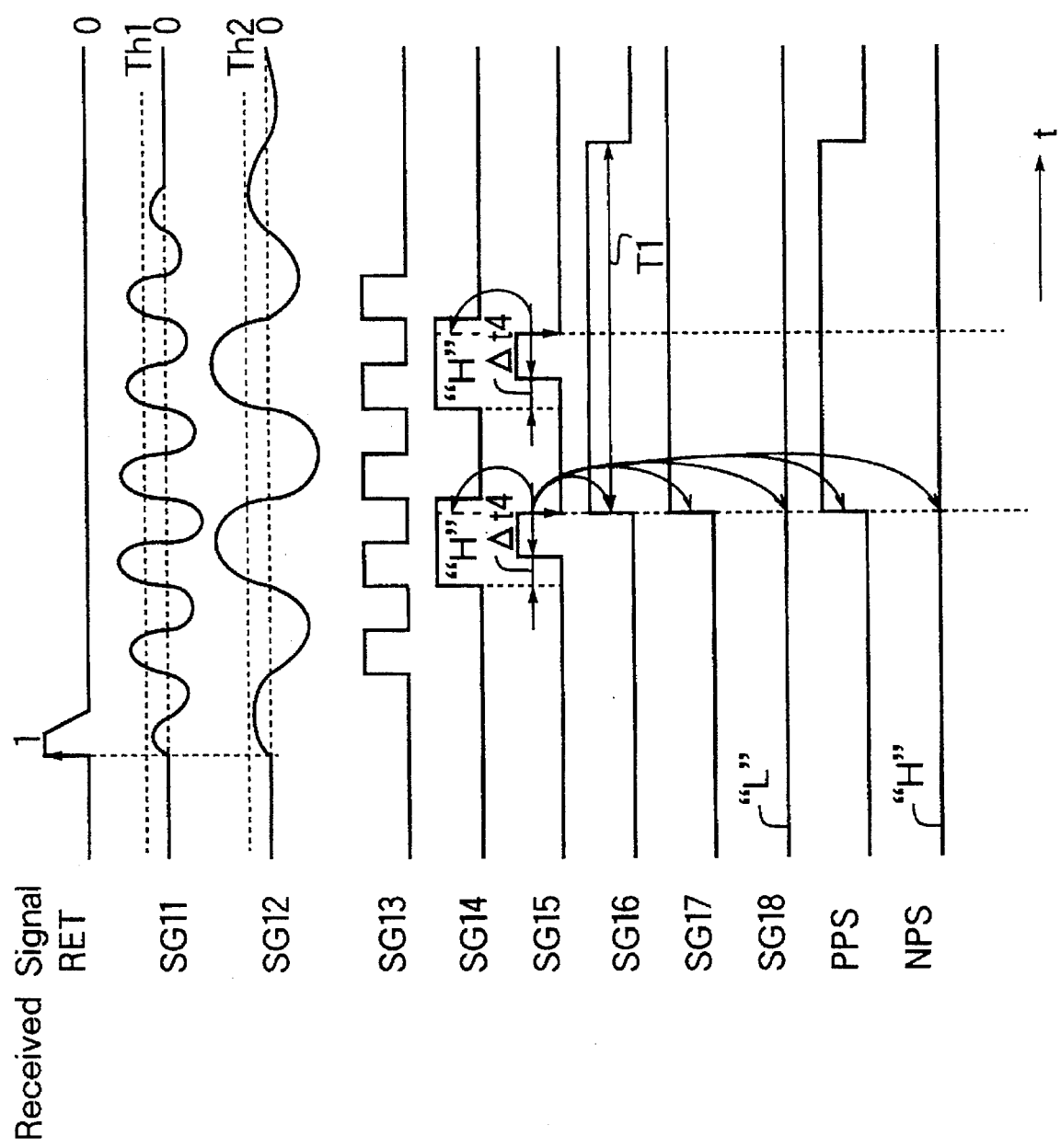
FIG. 11 is a timing chart showing an operation of the pulse detection and polarity discrimination circuit Ju1 shown in FIG. 5 in the case where the pulse detection and polarity discrimination circuit JU1 receives a reception signal of "1"
Figure 12:
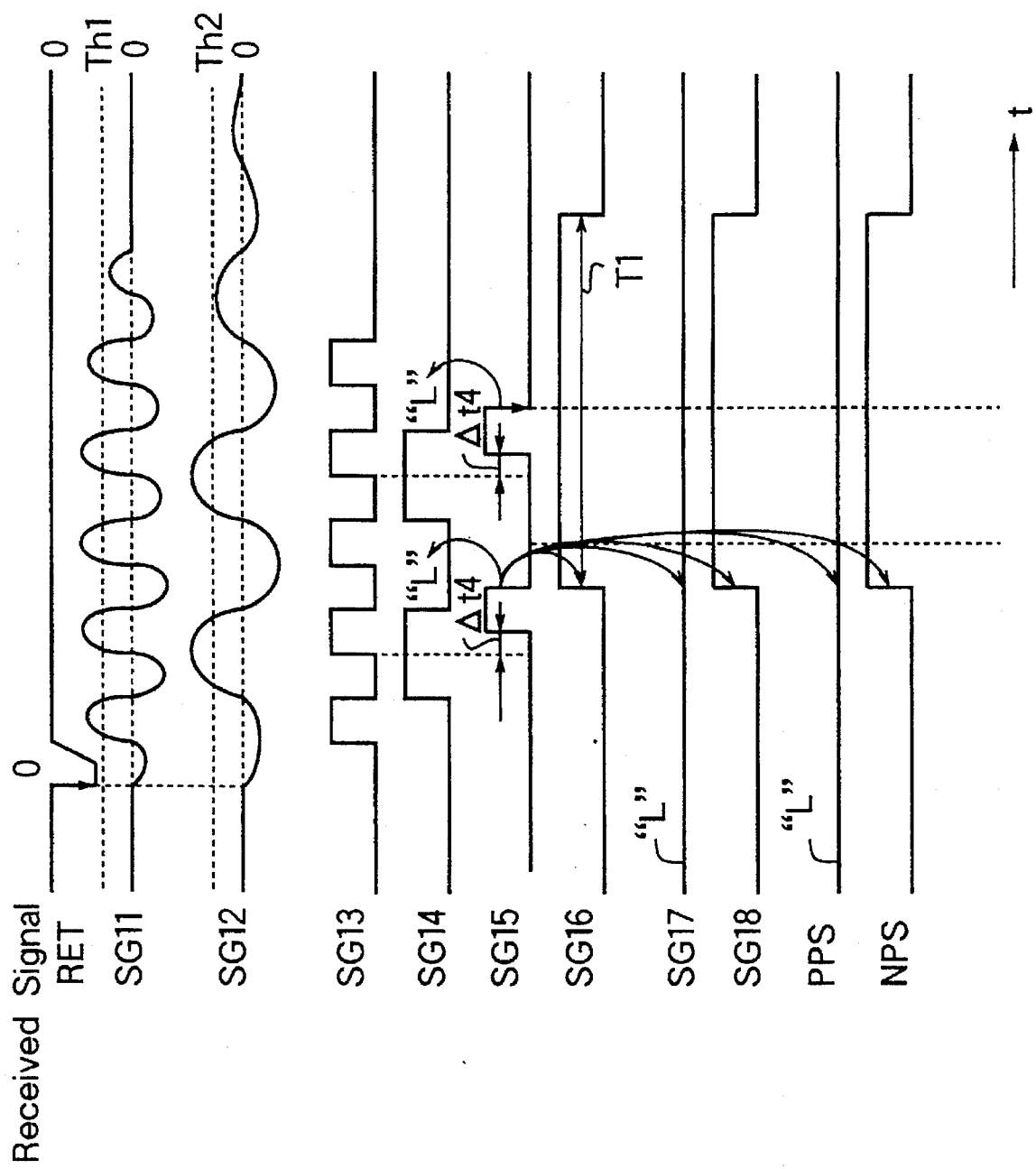
FIG. 12 is a timing chart showing an operation of the pulse detection and polarity discrimination circuit Ju1 shown in FIG. 5 in the case where the pulse detection and polarity discrimination circuit JU1 receives a reception signal of "0"

An operation of the pulse detection and polarity discrimination circuit JU1 having the above-mentioned construction shown in FIG. 5 will be described with reference to timing charts shown in FIGS. 11 and 12.

First of all, when a High-level reception signal of "1" is received by the pulse detection and polarity discrimination circuit JU1 shown in FIG. 5, both of the 10-MHz signal SG11 and the 5-MMz signal SG12 rise in accordance with the steep rise portion of the reception signal. Then, the positive-half-wave waveform shaping circuit 13 detects a time interval for which the signal SG11 has a level equal to or greater than the threshold level Th1, and outputs the High-level pulse signal SG13 for the detected time interval. On the other hand, the positive-half-wave waveform shaping circuit 14 detects a time interval for which the signal SG12 has a level equal to or greater than the threshold level Th2, and outputs the High-level pulse signal SG14 for the detected time interval. Then, after an elapse of a delay time Δt4 from the timing of the leading edge of the signal SG13, a signal SG15 which is the logical product of the signal SG13 and the signal SG14 is outputted. In the present case, the one-shot multi-vibrator MV1 outputs a High-level pulse signal SG16 for a predetermined time interval T1 from the timing of the trailing edge of the signal SG15. When the High-level pulse signal SG16 is outputted for the above-mentioned time interval T1, an output signal SG17 of the flip-flop FF2 also has the High level, and therefore, the High-level pulse signal for the above-mentioned time interval T1 is outputted as a positive pulse signal PPS from the AND gate AND5.

On the other hand, when a Low-level reception signal of "0" is received by the pulse detection and polarity discrimination circuit JU1 shown in FIG. 5, both of the 10-MHz signal SG11 and the 5-MHz signal SG12 fall in accordance with the steep fall portion of the reception signal. Then, the positive-half-wave waveform shaping circuit 13 detects a time interval for which the signal SG11 has a level equal to or greater than the threshold level Th1, and outputs the High-level pulse signal SG13 for the detected time interval. On the other hand, the positive-half-wave waveform shaping circuit 14 detects a time interval for which the signal SG12 has a level equal to greater than the threshold level Th2, and outputs the High-level pulse signal SG14 for the detected time interval. Then, after an elapse of the delay time Δt4 from the timing of the leading edge of the signal SG13, the signal SG15 which is the logical product of the signal SG13 and the signal SG14 is outputted. In the present case, the one-shot multi-vibrator MV1 outputs the High-level pulse signal SG16 for the predetermined time interval T1 from the timing of the trailing edge of the signal SG15. When the High-level pulse signal SG16 is outputted for the time interval T1, an inverted output signal SG18 of the flip-flop FF2 also has the High level, and therefore the High-level pulse signal for the above-mentioned time interval T1 is outputted as a negative pulse signal NPS from the AND gate AND6.

As described above, when the reception signal of "1" is received, both of the signal SG11 and the signal SG12 obtained through the resonance amplification process are generated in synchronization with the reception signal from the timing of the leading edge of the reception signal. With the above-mentioned operation, the leading edge of the signal SG13 and the leading edge of the signal SG14 are synchronized with each other, or the leading edge of the signal SG13 and the trailing edge of the signal SG14 are synchronized with each other, based on which, the High-level positive pulse signal PPS is outputted. When the reception signal of "0" is received, both of the signal SG11 and the signal SG12 obtained through the resonance amplification process are generated in synchronization with the timing of the trailing edge of the reception signal. With the above-mentioned operation, the trailing edge of the signal SG13 and the trailing edge of the signal SG14 are synchronized with each other, or the trailing edge of the signal SG13 and the leading edge of the signal SG14 are synchronized with each other, based on which, the High-level negative pulse signal NPS is outputted.

Figure 7:
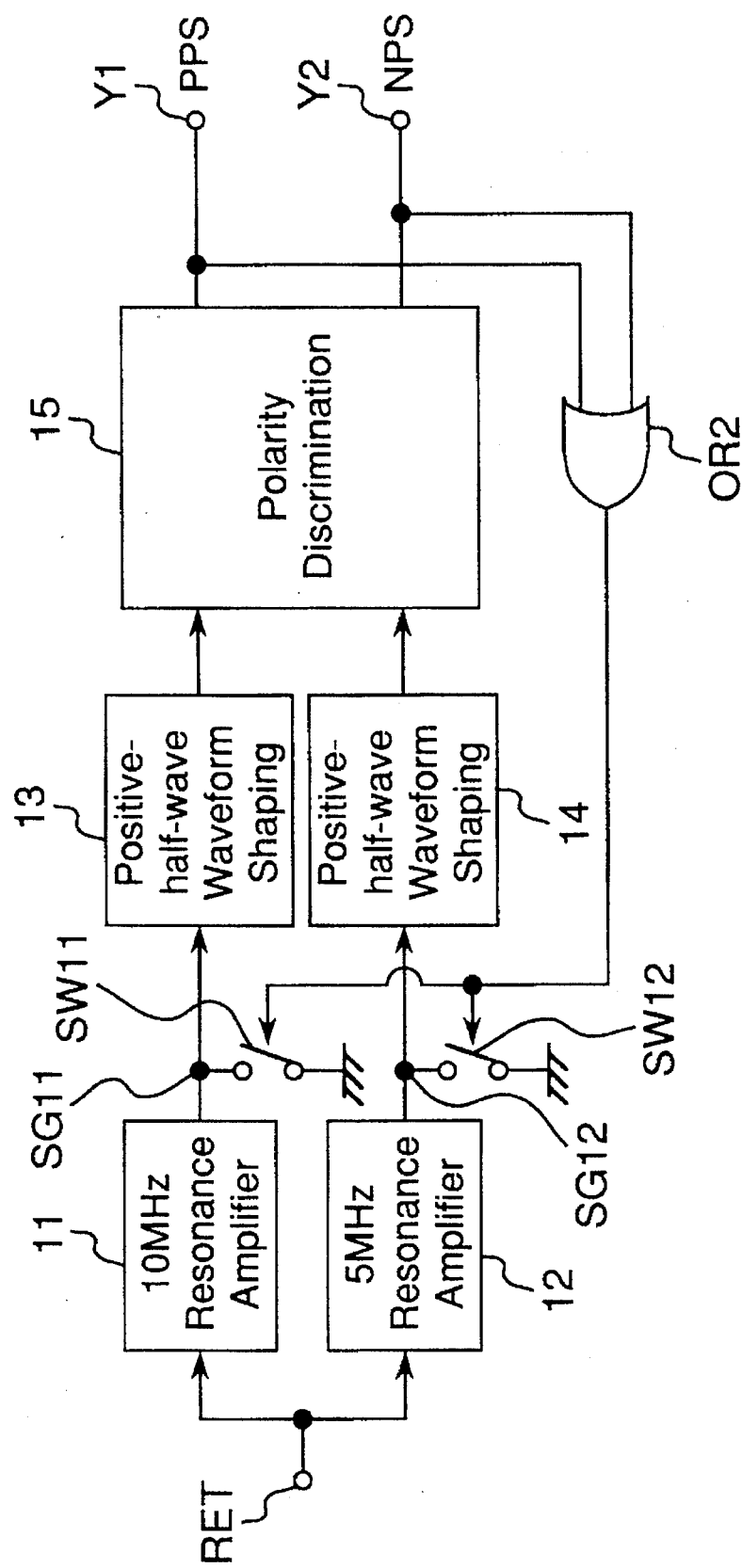
FIG. 7 is a circuit diagram showing a construction of a pulse detection and polarity discrimination circuit JU1b of a second modification of the pulse detection and polarity discrimination circuit JU1 shown in FIG. 5.
Figure 15:
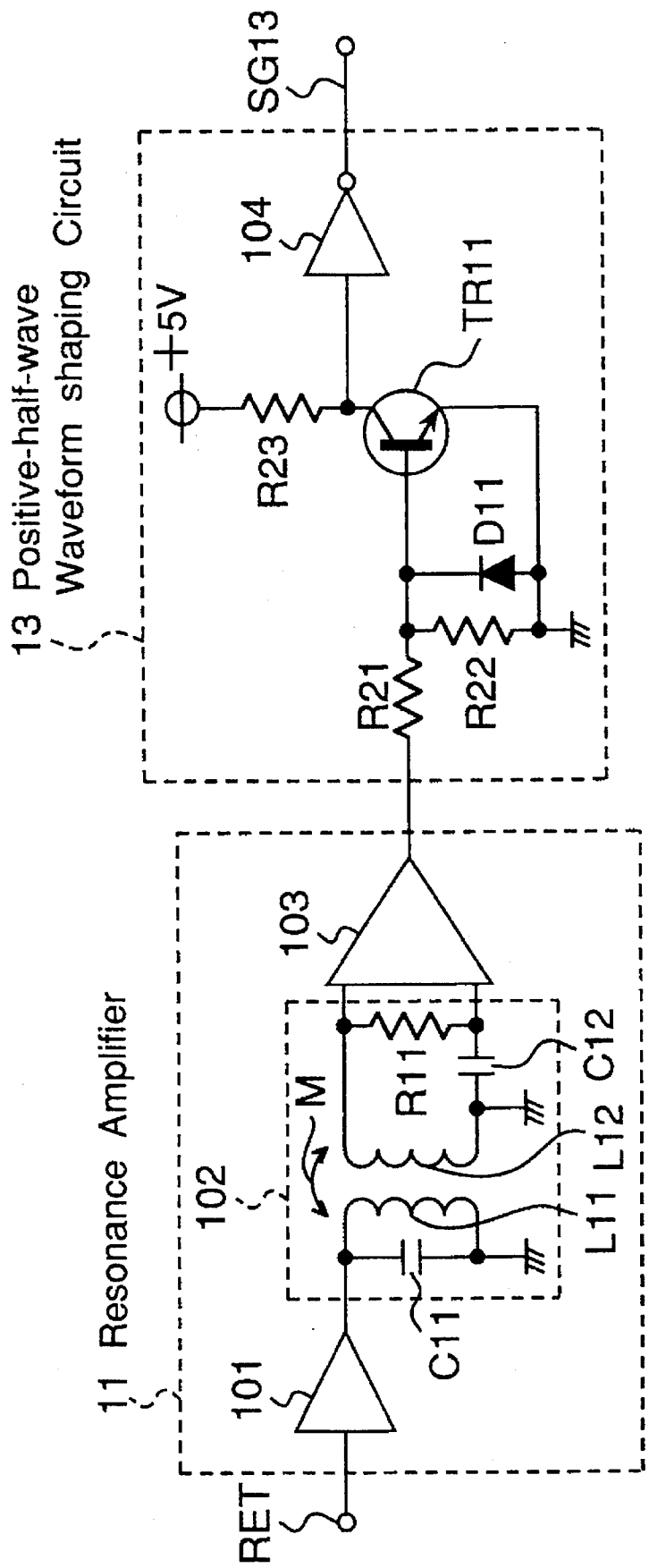
FIG. 15 is a circuit diagram showing a construction of a resonance amplifier 11 and a positive-half-wave waveform shaping circuit 13 which are shown in FIGS. 5 to 7.

FIG. 15 shows the resonance amplifier 11 and the positive-half-wave waveform shaping circuit 13 which are shown in FIGS. 5 to 7.

Referring to FIG. 15, the reception signal received through the reception terminal RET is inputted via an amplifier 101 to an LCR resonance circuit 102 of the resonance amplifier 11, which comprises the amplifiers 101 and 103, and the LCR resonance circuit 102. The resonance circuit 102 comprises a parallel circuit comprised of a capacitor C11 and an inductor L11 connected in parallel, and a series circuit comprised of an inductor L12, a capacitor C12 and a registor R11. In the resonance circuit 102, one end of the above-mentioned parallel circuit is connected to the output terminal of the amplifier 101, and another end thereof is connected to ground. Further, the inductor L11 is mutually magnetically coupled with the inductor L12. The connecting point between the inductor L12 and the capacitor C12 is connected to ground. Both ends of the resistor R11 are connected to input terminals of an amplifier 103, respectively.

The signal obtained through resonance amplification by the resonance amplifier 11 is outputted via the amplifier 103 and a resister R21 of the positive-half-wave waveform shaping circuit 13 to a base on an NPN type transistor TR11 thereof. In the waveform shaping circuit 13, a parallel circuit comprised of the resister R22 and the diode D11 connected in parallel is connected between the base and emitter of the transistor TR11, the collector of which is connected via a resistor R23 to a voltage source +5 V. The anode of diode D11 is connected to ground, and the diode D11 is provided for a limiter or a positive-half-wave waveform shaping process for the inputted signal. The waveform-shaped signal is outputted from the transistor TR11 via an amplifier 104 as the signal SG13.

It is to be noted that the resonance amplifier 12 is constructed in a manner similar to that of the resonance amplifier 11 except for that the resonance frequency of the resonance amplifier 12 is different from that of the resonance amplifier 11, and also the positive-half-wave waveform shaping circuit 14 has the same structure as that of the positive-half-wave waveform shaping circuit 13.

FIG. 6 is a circuit diagram showing a pulse detection and polarity discrimination circuit JU1a of a first modification of the pulse detection and polarity discrimination circuit JU1 shown in FIG. 5. The pulse detection and polarity discrimination circuit JU1a of the first modification differs from the circuit JU1 of the preferred embodiment shown in FIG. 5, as follows, in the circuit after the output terminals of the positive-half-wave waveform shaping circuits 13 and 14.

The signal SG13 outputted from the positive-half-wave waveform shaping circuit 13 is inputted to a first input terminal of an AND gate AND11 and to a first input terminal of an AND gate AND13. On the other hand, the signal SG14 outputted from the positive-half-wave waveform shaping circuit 14 is inputted to a one-shot multi-vibrator MV11. The one-shot multi-vibrator MV11 outputs a High-level pulse signal SG26 having a time interval T11 equal to one half of the period of the frequency of 10 MHz from the timing of the leading edge of the inputted signal SG14 to a second input terminal of the AND gate AND11, and outputs the same signal SG26 to a one-shot multi-vibrator MV12. The one-shot multi-vibrator MV12 outputs a High-level pulse signal SG27 having a time interval T12 equal to the time interval T11 to a second input terminal of the AND gate AND13. In the present case, the one-shot multi-vibrator MV11 generates the pulse signal SG26 representing the first half part of the pulse of the signal SG14, while the one-shot multi-vibrator MV12 generates the pulse signal SG27 representing the second half part of the pulse of the signal SG14.

The AND gate AND11 detects the High-level digital signal based on the signal SG13 and the signal SG26, and then, outputs a signal SG28 representing the detection result to a second input terminal of an AND gate AND12. The AND gate AND12 is a gate for preventing the output of the AND gate AND11 from having the High level even when the output of the AND gate AND13 becomes the High level while a multi-vibrator MV22 described hereinafter detects a Low-level digital signal. A signal SG32 outputted from the AND gate AND12 is inputted to a one-shot multi-vibrator MV21. The one-shot multi-vibrator MV21 outputs a High-level pulse signal having a predetermined time interval T21 from the timing of the leading edge of the inputted signal SG32 as a positive pulse signal PPS from an output terminal Q thereof and then outputs the same signal via an output terminal Y1, and outputs the same signal as a signal SG31 from an inverted output terminal $\overline{Q}$ thereof to a first input terminal of an AND gate AND14. In the present case, the above-mentioned time interval T1 is set so as to be longer than a time interval for which a resonance pulse reduces to completely disappear and shorter than the signal period of the transmission signal.

A signal SG30 outputted from the AND gate AND13 is inputted to a second input terminal of the AND gate AND14. The AND gate AND14 is a gate for preventing the output signal SG30 of the AND gate AND13 from having the High level even when the output of the AND gate AND11 becomes the High level while the multi-vibrator MV21 detects a Low-level digital signal. A signal SG33 outputted from the AND gate AND14 is inputted to the one-shot multi-vibrator MV22. The one-shot multi-vibrator MV22 outputs a High-level pulse signal having a predetermined time internal T22 equal to the time interval T21 from the timing of the leading edge of the inputted signal SG33 as a negative pulse signal NPS from an output terminal Q thereof and then outputs the same signal via an output terminal Y2, and outputs the same signal as a signal SG29 from an inverted output terminal $\overline{Q}$ to the first input terminal of the AND gate AND12.

Figure 13:
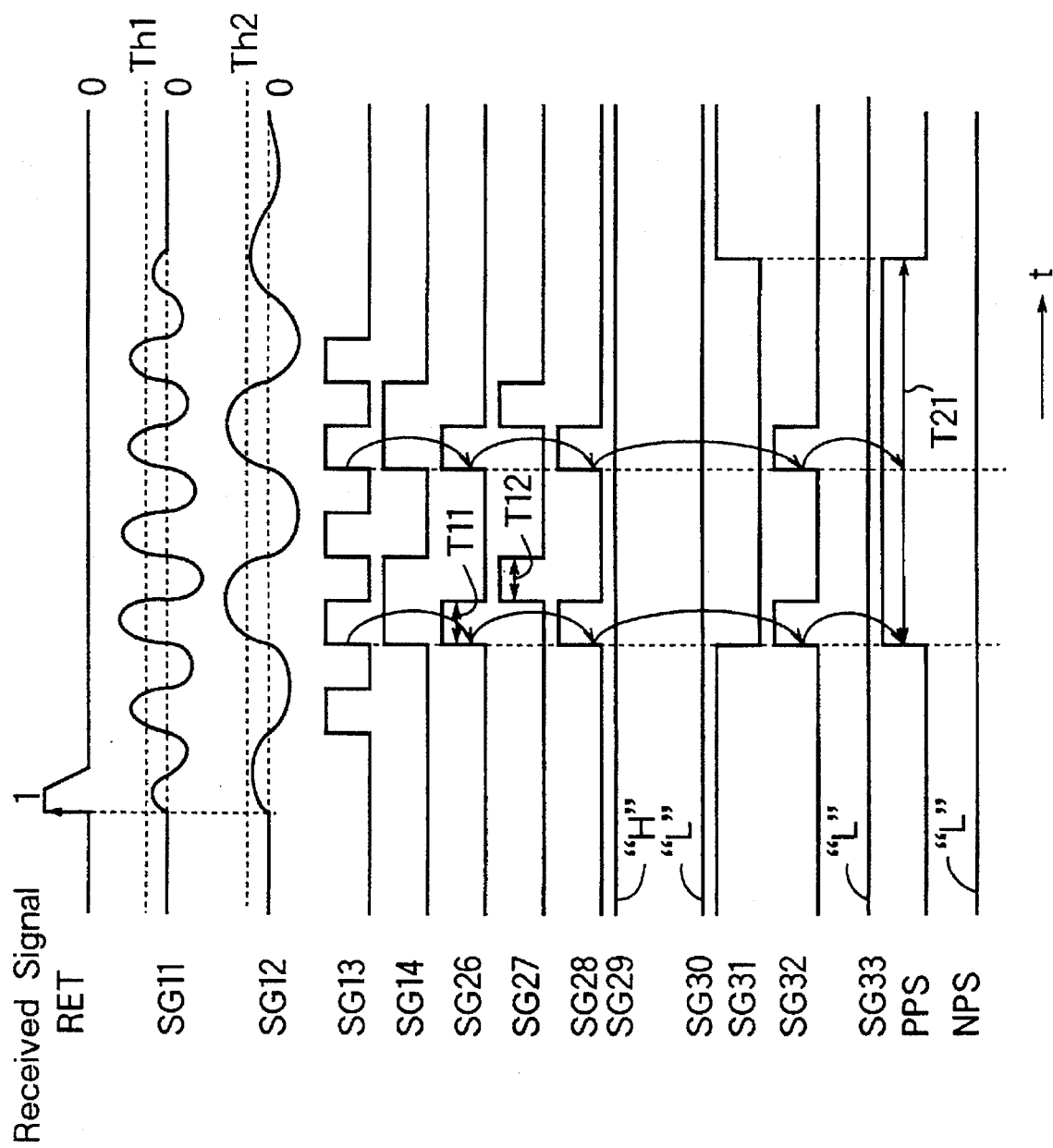
FIG. 13 is a timing chart showing an operation of the pulse detection and polarity discrimination circuit JU1a shown in FIG. 6 in the case where the pulse detection and polarity discrimination circuit JU1a receives a reception signal of "1"
Figure 14:
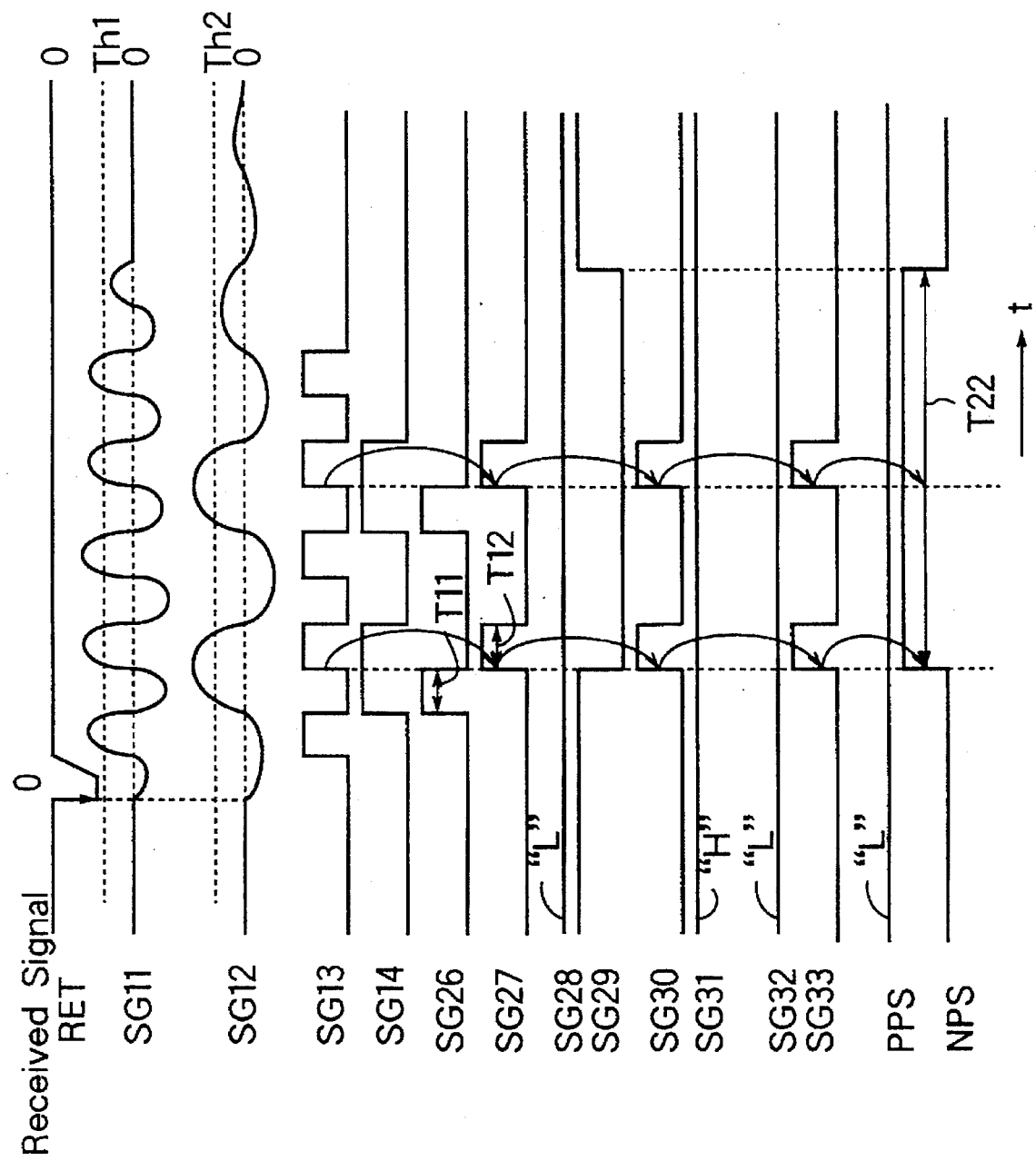
FIG. 14 is a timing chart showing an operation of the pulse detection and polarity discrimination circuit JU1a shown in FIG. 6 in the case where the pulse detection and polarity discrimination circuit JU1a receives a reception signal of "0"

An operation of the pulse detection and polarity discrimination circuit JU1a having the above-mentioned construction shown in FIG. 6 will be described with reference to timing charts shown in FIGS. 13 and 14.

First of all, when the High-level reception signal of "1" is received by the pulse detection and polarity discrimination circuit JU1a shown in FIG. 6, both of the 10-MHz signal SG11 and the 5-MHz signal SG12 rise in accordance with the steep rise portion of the reception signal. The positive-half-wave waveform shaping circuit 13 detects a time interval for which the signal SG11 has a level equal to or greater than the threshold level Th1, and outputs the High-level pulse signal SG13 for the detected time interval. On the other hand, the positive-half-wave waveform shaping circuit 14 detects a time interval for which the signal SG12 has a level equal to or greater than the threshold level Th2, and outputs the High-level pulse signal SG14 for the detected time interval. The multi-vibrator MV11 outputs a High-level pulse signal SG26 for the time interval T11 representing the first half part of the signal SG14 at the timing of the leading edge of the signal SG14. In response to the pulse signal SG26, the multi-vibrator MV12 outputs a High-level pulse signal SG27 for the time interval T12 representing the second half part of the signal SG14 at the timing of the trailing edge of the signal SG26. At the timing of the leading edge of the signal SG13, the AND gate AND11 outputs a High-level pulse signal to the multi-vibrator MV21 via the AND gate AND12. In response to the High-level pulse signal, the multi-vibrator MV21 outputs the positive pulse signal PPS which is the High-level pulse signal for the time interval T21 via the output terminal Y1 of the pulse detection and polarity discrimination circuit JU1a.

When a Low-level reception signal of "0" is received by the pulse detection and polarity discrimination circuit JU1a shown in FIG. 6, both of the 10-MHz signal SG11 and the 5-MHz signal SG12 fall in accordance with the steep fall portion of the reception signal. The positive-half-wave waveform shaping circuit 13 detects a time interval for which the signal SG11 has a level equal to or greater than the threshold level Th1, and outputs the High-level pulse signal SG13 for the detected time interval. On the other hand, the positive-half-wave waveform shaping circuit 14 detects a time interval for which the signal SG12 has a level equal to or greater than the threshold level Th2, and outputs the High-level pulse signal SG14 for the detected time interval. The multi-vibrator MV11 outputs a High-level pulse signal SG26 for the time interval T11 representing the first half part of the signal SG14 at the timing of the leading edge of the signal SG14. In response to the pulse signal SG26, the multi-vibrator MV12 outputs a High-level pulse signal SG27 for the time interval T12 representing the second half part of the signal SG14 at the timing of the trailing edge of the signal SG26. At the timing of the leading edge of the signal SG27 corresponding to the timing of the leading edge of the signal SG13, the AND gate AND13 outputs a High-level pulse signal SG30 to the multi-vibrator MV22 via the AND gate AND14. In response to the pulse signal SG30, the multi-vibrator MV22 outputs the negative pulse signal NPS which is the High-level pulse signal for the time interval T22 via the output terminal Y2 of the pulse detection and polarity discrimination circuit JU1a.

As described above, the High-level digital signal or the Low-level digital signal is detected based on a phasic relationship between the detected positive-half-wave waveform shaping signals SG13 and SG14, and then the respective positive and negative pulse signals PPS and NPS are outputted.

According to an experiment of the present inventor, a digital signal transmission having a rate of 200 kbps was able to be performed using the above-mentioned circuit. Furthermore, according to the experiment of the present inventor, the frequency range owned by the transmitted digital signal ranges from the DC component to a frequency of about 50 MHz, and the maximum frequency depends on the degree of rise or the leading edge (the degree of steepness, or the angle of slope) of the pulse to be transmitted as publicly known to those skilled in the art.

The binary digital signal transmission system of the present preferred embodiment having the above-mentioned construction has a circuit architecture simpler than that of the conventional apparatus, thereby allowing the manufacturing cost to be very low. For instance, the binary digital signal transmission system can be used for transmission of a digital signal between personal computers. When the level of the transmission signal is heightened, discrimination between two values can be achieved even when the signal is transmitted over a long distance.

Although the above-mentioned preferred embodiment employs the 10-MHz resonance amplifier 11 and the 5-MHz resonance amplifier 12, the present invention is not limited to these resonance amplifiers. There may be employed resonance amplifiers (also referred to as tuned amplifiers) having two resonance frequencies which are high-frequency or low-frequency alternating currents equal to or lower than the maximum frequency of the above-mentioned frequency range, and have such a mutual relationship that they are even multiples of each other. The signal detection of the received digital signal may be performed based on the relationship in phase between the output signals SG11 and SG12 of the respective resonance amplifiers 11 and 12. In other words, in a preferred embodiment, the positive pulse signal PPS may be generated when the resonance amplification signal SG11 having the relatively high resonance frequency of 10 MHz rises, and the negative pulse signal NPS may be generated when the resonance amplification signal SG11 falls, respectively at the zero cross point of the resonance amplification signal SG12 having the relatively low resonance frequency of 5 MHz.

Although the above-mentioned preferred embodiment employs the positive-half-wave waveform shaping circuits 13 and 14, the present invention is not limited to this, and negative-half-wave waveform shaping circuits may be employed instead.

Although the rate of transmission of each of the signals SG11 and SG12 outputted respectively from the resonance amplifiers 11 and 12 is selected so that a bit processing operation is continuously performed and the next bit processing operation is not performed until each of the signals is naturally attenuated, the present invention is not limited to this. There may be adopted a construction as shown in a pulse detection and polarity discrimination circuit JU1b shown in FIG. 7, in which, by grounding the output terminals of the resonance amplifiers 11 and 12 respectively via analog switches SW11 and SW12, forming a logical sum signal of the positive pulse signal PPS and the negative pulse signal NPS by means of an OR gate OR2, and turning on the analog switches SW11 and SW12 according to the logical sum signal, unnecessary signal components after the first two periods of the signal having the higher resonance frequency from the signals SG11 and SG12 may be grounded. With the above-mentioned arrangement, the rate of transmission of the digital signal can be increased more than that of the above-mentioned preferred embodiment. It is to be noted that, in FIG. 7, a polarity discrimination circuit 15 is a polarity discrimination circuit for each pulse existing between the output terminals of the positive-half-wave waveform shaping circuits 13 and 14 and the output terminals Y1 and Y2 in either of the circuits JU1 and JU1a shown in FIGS. 5 and 6.

Although the above-mentioned preferred embodiment employs the twisted pair cable 3, the present invention is not limited to this, and a cable of another type such as a cable employing another metal or a coaxial cable may be employed.

According to the present invention as described in detail above, a transmitter generates a binary digital signal comprising at least a rise portion where the signal level steeply rises in the case of a first value and at least a fall portion where the signal level steeply falls in the case of a second value, and transmits the signal. On the other hand, a receiver receives the above-mentioned transmitted binary digital signal, and thereafter extracts first and second resonance signals by means of two resonance circuits having two resonance frequencies which are even multiples of each other, thereby discriminating the value of the above-mentioned received binary digital signal based on the phasic relationship between the first and second resonance signals.

With the above-mentioned arrangement, there can be achieved a circuit construction simpler than that of the conventional apparatus together with a remarkable reduction of the manufacturing cost. Therefore, a system having such a circuit construction can be used, for example, in transmitting a digital signal between personal computers. By increasing the level of the transmission signal, there is produced such an advantage that the discrimination between two values of the signal transmitted over a relatively long distance can be achieved with a simple construction.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A binary digital signal transmission system for transmitting a binary digital signal via a cable in accordance with inputted binary digital data, comprising a transmitter and a receiver, wherein said transmitter comprises transmitting means for generating said binary digital signal including at least a rise portion where a level of said binary digital signal steeply rises in accordance with said inputted binary digital data of a first value and at least a fall portion where the level of said binary digital signal steeply falls in accordance with said inputted binary digital data of a second value, and for transmitting said binary digital signal via said cable to said receiver, and wherein said receiver comprises receiving means for receiving said binary digital signal transmitted by said transmitting means;

first and second resonance means respectively having first and second resonance frequencies which are even multiples of each other, for respectively extracting first and second resonance signals respectively having resonance frequency components of said first and second resonance frequencies, from said binary digital signal received by said receiving means; and discriminating means for discriminating a value of said binary digital data corresponding to said received binary digital signal based on a phase relationship between said first and second resonance signals extracted by said first and second resonance means and outputting either one of a pulse signal representing the first value and another pulse signal representing the second value.

2. The binary digital signal transmission system as claimed in claim 1, wherein said transmitting means comprises:

a first three-state buffer amplifier;

a first diode, an anode of said first diode being connected to an output terminal of said first three-state buffer amplifier, a cathode of said first diode being connected via a first load resistor to ground;

a second three-state buffer amplifier;

a second diode, a cathode of said second diode being connected to an output terminal of said second three-state buffer amplifier, an anode of said second diode being connected via a second load resistor to ground; and control means for controlling said first and second three-state buffer amplifiers, so that said first three-state buffer amplifier outputs a high-level signal and an output terminal of said second three-state buffer amplifier assumes a high-impedance state in accordance with said inputted binary digital data of the first value, and so that an output terminal of said first three-state buffer amplifier assumes a high-impedance state and said second three-state buffer amplifier outputs a low-level signal in accordance with said inputted binary digital data of the second value.

3. The binary digital signal transmission system as claimed in claim 2, wherein said transmitting means, in accordance with said inputted binary digital data of the first value, transmits said binary digital signal, whose voltage steeply rises from a zero-voltage level, thereafter maintains a predetermined positive voltage level for a predetermined time interval, and then reduces to the zero-voltage level as time elapses; and said transmitting means, in accordance with said inputted binary digital data of the second value, transmits said binary digital signal, whose voltage steeply falls from a predetermined high level, thereafter maintains the zero-voltage level for a predetermined time interval, and then increases to the predetermined high level as time elapses.

4. The binary digital signal transmission system as claimed in claim 1, wherein said transmitting means comprises:

a first electrolytic capacitor;

a first switch for connecting a positive polarity electrode of said first electrolytic capacitor to an output terminal of said transmitting means, a negative polarity electrode of said first electrolytic capacitor being connected to ground;

a first voltage source for electrically charging said first electrolytic capacitor so as to charge a predetermined positive voltage therein;

a second electrolytic capacitor;

a second switch for connecting a negative polarity electrode of said second electrolytic capacitor to the output terminal of said transmitting means, a positive polarity electrode of said second electrolytic capacitor being connected to ground;

a second voltage source for electrically charging said second electrolytic capacitor so as to charge a predetermined negative voltage therein; and control means for controlling said first and second switches, so as to turn on said first switch and turn off said second switch in accordance with said inputted binary digital data of the first value, thereby electrically discharging the positive voltage from said first electrolytic capacitor to the output terminal of said transmitting means, and so as to turn off said first switch and turn on said second switch in accordance with said inputted binary digital data of the second value, thereby electrically discharging the negative voltage from said second electrolytic capacitor to the output terminal of said transmitting means.

5. The binary digital signal transmission system as claimed in claim 4, wherein said transmitting means, in accordance with said inputted binary digital data of the first value, transmits said binary digital signal, whose voltage steeply rises from a zero-voltage level, and then exponentially reduces to the zero-voltage level; and said transmitting means, in accordance with said inputted binary digital data of the second value, transmits said binary digital signal, whose voltage steeply falls from the zero-voltage level, and then exponentially increases to the zero-voltage level.

6. The binary digital signal transmission system as claimed in claim 1, wherein said discriminating means comprises:

first waveform shaping means for detecting a positive-half-wave first pulse signal having a level greater than a predetermined first threshold level from said first resonance signal outputted from said first resonance means;

second waveform shaping means for detecting a positive-half-wave second pulse signal having a level greater than a predetermined second threshold level from said second resonance signal outputted from said second resonance means;

first AND gate means for calculating a logical product of the first pulse signal outputted from said first waveform shaping means and the second pulse signal outputted from said second waveform shaping means, and outputting a third pulse signal representing a resulting logical product;

delay means for delaying the third pulse signal by a predetermined delay time and outputting a delayed pulse signal;

one-shot multivibrator means for generating a fourth pulse signal having a predetermined time interval from a timing of a trailing edge of the delayed pulse signal outputted from said delay means;

flip-flop means for latching a level of the second pulse signal outputted from said second waveform shaping means at a timing of a trailing edge of the delayed pulse signal outputted from said delay means, outputting a non-inverted signal representing the latched level, and outputting an inverted signal of the non-inverted signal;

second AND gate means for calculating a logical product of the fourth pulse signal outputted from said one-shot multivibrator means and the non-inverted signal outputted from said flip-flop means, and outputting a fifth pulse signal representing a resulting logical product, as the pulse signal representing the first value of said inputted binary digital signal; and third AND gate means for calculating a logical product of the fourth pulse signal outputted from said one-shot multivibrator means and the inverted signal outputted from said flip-flop means, and outputting a sixth pulse signal representing a resulting logical product as the another pulse signal representing the second value of said inputted binary digital signal.

7. The binary digital signal transmission system as claimed in claim 1, wherein said discriminating means comprises:

first waveform shaping means for detecting a positive-half-wave first pulse signal having a level greater than a predetermined first threshold level from said first resonance signal outputted from said first resonance means;

second waveform shaping means for detecting a positive-half-wave second pulse signal having a level greater than a predetermined second threshold level from said second resonance signal outputted from said second resonance means;

first one-shot multivibrator means for generating a third pulse signal representing a first half part of the second pulse signal outputted from said second waveform shaping means, in accordance with the second pulse signal outputted from said second waveform shaping means;

second one-shot multivibrator means for generating a fourth pulse signal representing a second half part of the second pulse signal outputted from said second waveform shaping means, in accordance with the third pulse signal outputted from said first one-shot multivibrator means;

third one-shot multivibrator means for generating and outputting a first non-inverted pulse signal and a first inverted pulse signal in accordance with a first inputted pulse signal;

fourth one-shot multivibrator means for generating and outputting a second non-inverted pulse signal and a second inverted pulse signal in accordance with a second inputted pulse signal;

first AND gate means for calculating a logical product of the first pulse signal outputted from said first waveform shaping means and the third pulse signal outputted from said first one-shot multivibrator means, and outputting a fifth pulse signal representing a resulting logical product;

second AND gate means for calculating a logical product of the fifth pulse signal outputted from said first AND gate means and the second inverted pulse signal outputted from said fourth one-shot multivibrator means, and outputting a sixth pulse signal representing a resulting logical product to said third one-shot multivibrator means as the first inputted pulse signal;

third AND gate means for calculating a logical product of the first pulse signal outputted from said first waveform shaping means and the fourth pulse signal outputted from said second one-shot multivibrator means, and outputting a seventh pulse signal representing a resulting logical product; and fourth AND gate means for calculating a logical product of the seventh pulse signal outputted from said third AND gate means and the first inverted pulse signal outputted from said third one-shot multivibrator means, and outputting an eighth pulse signal representing a resulting logical product to said fourth one-shot multivibrator means as the second inputted pulse signal, wherein said third one-shot multivibrator means generates the first non-inverted pulse signal as a first output pulse signal corresponding to the first value of said inputted binary digital data, the first output pulse signal having a predetermined first time interval at a timing of a leading edge of the sixth pulse signal outputted from said second AND gate means, and said fourth one-shot multivibrator means generates the second non-inverted pulse signal as a second output pulse signal corresponding to the second value of said inputted binary digital data, the second output pulse signal having a predetermined second time interval at a timing of a leading edge of the eighth pulse signal outputted from said fourth AND gate means.

8. The binary digital signal transmission system as claimed in claim 1, further comprising:

a first switch, one end of said first switch being connected to an output terminal of said first resonance means, another end of said first switch being connected to ground;

a second switch, one end of said second switch being connected to an output terminal of said second resonance means, another end of said second switch being connected to ground; and further control means for turning on said first and second switches in accordance with the pulse signals outputted from said discriminating means.

9. A receiver apparatus for receiving a binary digital signal via a cable transmitted from a transmitter in accordance with inputted binary digital data, said binary digital signal including at least a rise portion where a level of said binary digital signal steeply rises in accordance with said inputted binary digital data of a first value, and at least a fall portion where the level of said binary digital signal steeply falls in accordance with said inputted binary digital data of a second value, the receiver apparatus comprising:

receiving means for receiving said binary digital signal transmitted by said transmitter;

first and second resonance means respectively having first and second resonance frequencies which are even multiples of each other, for respectively extracting first and second resonance signals respectively having resonance frequency components of said first and second resonance frequencies, from said binary digital signal received by said receiving means; and discriminating means for discriminating a value of said binary digital data corresponding to said received binary digital signal based on a phase relationship between said first and second resonance signals extracted by said first and second resonance means, and outputting either one of a pulse signal representing the first value and another pulse signal representing the second value.

10. The receiver apparatus as claimed in claim 9, wherein said discriminating means comprises:

first waveform shaping means for detecting a positive-half-wave first pulse signal having a level greater than a predetermined first threshold level from said first resonance signal outputted from said first resonance means;

second waveform shaping means for detecting a positive-half-wave second pulse signal having a level greater than a predetermined second threshold level from said second resonance signal outputted from said second resonance means;

first AND gate means for calculating a logical product of the first pulse signal outputted from said first waveform shaping means and the second pulse signal outputted from said second waveform shaping means, and outputting a third pulse signal representing a resulting logical product;

delay means for delaying the third pulse signal by predetermined delay time and outputting a delayed pulse signal;

one-shot multivibrator means for generating a fourth pulse signal having a predetermined time interval from a timing of a trailing edge of the delayed pulse signal outputted from said delay means;

flip-flop means for latching a level of the second pulse signal outputted from said second waveform shaping means at a timing of a trailing edge of the delayed pulse signal outputted from said delay means, outputting a non-inverted signal representing the latched level, and outputting an inverted signal of the non-inverted signal;

second AND gate means for calculating a logical product of the fourth pulse signal outputted from said one-shot multivibrator means and the non-inverted signal outputted from said flip-flop means, and outputting a fifth pulse signal representing resulting logical product, as the pulse signal representing the first value of said inputted binary digital signal; and third AND gate means for calculating a logical product of the fourth pulse signal outputted from said one-shot multivibrator means and the inverted signal outputted from said flip-flop means, and outputting a sixth pulse signal representing a resulting logical product as the another pulse signal representing the second value of said inputted binary digital signal.

11. The receiver apparatus as claimed in claim 9, wherein said discriminating means comprises:

first waveform shaping means for detecting a positive-half-wave first pulse signal having a level greater than a predetermined first threshold level from said first resonance signal outputted from said first resonance means;

second waveform shaping means for detecting a positive-half-wave second pulse signal having a level greater than a predetermined second threshold level from said second resonance signal outputted from said second resonance means;

first one-shot multivibrator means for generating a third pulse signal representing a first half part of the second pulse signal outputted from said second waveform shaping means, in accordance with the second pulse signal outputted from said second waveform shaping means;

second one-shot multivibrator means for generating a fourth pulse signal representing a second half part of the second pulse signal outputted from said second waveform shaping means, in accordance with the third pulse signal outputted from said first one-shot multivibrator means;

third one-shot multivibrator means for generating and outputting a first non-inverted pulse signal and a first inverted pulse signal in accordance with a first inputted pulse signal;

fourth one-shot multivibrator means for generating and outputting a second non-inverted pulse signal and a second inverted pulse signal in accordance with a second inputted pulse signal;

first AND gate means for calculating a logical product of the first pulse signal outputted from said first waveform shaping means and the third pulse signal outputted from said first one-shot multivibrator means, and outputting a fifth pulse signal representing a resulting logical product;

second AND gate means for calculating a logical product of the fifth pulse signal outputted from said first AND gate means and the second inverted pulse signal outputted from said fourth one-shot multivibrator means, and outputting a sixth pulse signal representing a resulting logical product to said third one-shot multivibrator means as the first inputted pulse signal;

third AND gate means for calculating a logical product of the first pulse signal outputted from said first waveform shaping means and the fourth pulse signal outputted from said second one-shot multivibrator means, and outputting a seventh pulse signal representing a resulting logical product; and fourth AND gate means for calculating a logical product of the seventh pulse signal outputted from said third AND gate means and the first inverted pulse signal outputted from said third one-shot multivibrator means, and outputting an eighth pulse signal representing a resulting logical product to said fourth one-shot multivibrator means as the second inputted pulse signal, wherein said third one-shot multivibrator means generates the first non-inverted pulse signal as a first output pulse signal corresponding to the first value of said inputted binary digital data, the first output pulse signal having a predetermined first time interval at a timing of a leading edge of the sixth pulse signal outputted from said second AND gate means, and said fourth one-shot multivibrator means generates the second non-inverted pulse signal as a second output pulse signal corresponding to the second value of said inputted binary digital data, the second output pulse signal having a predetermined second time interval at a timing of a leading edge of the eighth pulse signal outputted from said fourth AND gate means.

12. The receiver apparatus as claimed in claim 9, further comprising:

a first switch, one end of said first switch being connected to an output terminal of said first resonance means, another end of said first switch being connected to ground;

a second switch, one end of said second switch being connected to an output terminal of said second resonance means, another end of said second switch being connected to ground; and control means for turning on said first and second switches in accordance with the pulse signals outputted from said discriminating means.

13. A method for transmitting a binary digital signal via a cable in accordance with inputted binary digital data, for use in a binary digital signal transmission system comprising a transmitter, a receiver and said cable for connecting said transmitter to said receiver, said method including the steps of:

generating said binary digital signal including at least a rise portion where a level of said binary digital signal steeply rises in accordance with said inputted binary digital data of a first value, and at least a fall portion where the level of said binary digital signal steeply falls in accordance with said inputted binary digital data of a second value;

transmitting said binary digital signal from said transmitter via said cable to said receiver;

receiving said transmitted binary digital signal via said cable;

extracting first and second resonance signals respectively having resonance frequency components of first and second resonance frequencies, from said received binary digital signal, using first and second resonance circuits respectively having the first and second resonance frequencies which are even multiples of each other; and discriminating a value of said binary digital data corresponding to said received binary digital signal based on a phase relationship between said extracted first and second resonance signals, and outputting either one of a pulse signal representing the first value and another pulse signal representing the second value.

\* \* \* \* \*